(12) United States Patent
Burner et al.

(10) Patent No.: US 6,282,548 B1
(45) Date of Patent: *Aug. 28, 2001

(54) AUTOMATICALLY GENERATE AND DISPLAYING METADATA AS SUPPLEMENTAL INFORMATION CONCURRENTLY WITH THE WEB PAGE, THERE BEING NO LINK BETWEEN WEB PAGE AND METADATA

(75) Inventors: Michael G. Burner, Half Moon Bay; Bruce C. Gilliat, Alameda; Eric W. Jaquith; David L. Marvit, both of San Francisco, all of CA (US); Brewster Kahle, Seattle, WA (US); Niall O'Driscoll, San Francisco, CA (US); Z E. Smith, San Francisco, CA (US); Ronna C. Tanenbaum, San Francisco, CA (US)

(73) Assignee: Alexa Internet, San Francisco, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/880,117

(22) Filed: Jun. 21, 1997

(51) Int. Cl.[7] .................................................. G06F 17/30
(52) U.S. Cl. ............................. 707/104; 707/5; 707/10; 707/102; 707/501; 707/513; 709/219
(58) Field of Search ........................ 707/1–10, 100–104, 707/200–206, 501, 511–514, 526, 907; 709/203, 231–232, 248–250; 705/26–27

(56) References Cited

U.S. PATENT DOCUMENTS

| | | | |
|---|---|---|---|
| 5,544,360 | 8/1996 | Jerzy | 707/1 |
| 5,696,989 | * 12/1997 | Baker et al. | 395/187.01 |
| 5,706,507 | * 1/1998 | Schloss | 395/615 |
| 5,727,129 | * 3/1998 | Barrett et al. | 395/12 |
| 5,731,805 | * 3/1998 | Tognazzini et al. | 345/156 |
| 5,737,619 | * 4/1998 | Judson | 395/761 |
| 5,761,436 | * 6/1998 | Nielsen | 709/245 |
| 5,764,906 | * 6/1998 | Edelstein et al. | 395/200.49 |
| 5,778,368 | * 7/1998 | Hogan et al. | 707/10 |
| 5,793,964 | * 8/1998 | Rogers et al. | 395/200.32 |
| 5,832,496 | * 11/1998 | Anand et al. | 707/102 |
| 5,845,299 | * 12/1998 | Arora et al. | 707/513 |
| 5,848,407 | * 12/1998 | Ishikawa et al. | 707/2 |
| 5,855,020 | * 12/1998 | Kirsch | 707/10 |
| 5,960,409 | * 9/1999 | Wexler | 705/14 |

OTHER PUBLICATIONS

Mike Burner, "Building an Archive of the World Wide Web. Crawling towards Eternity," Web Techniques. May 1997, pp. 37–40.

(List continued on next page.)

*Primary Examiner*—Anton W. Fetting
*Assistant Examiner*—Srirama Channavajjala
(74) *Attorney, Agent, or Firm*—Fenwick & West LLP

(57) ABSTRACT

A method and apparatus that displays metadata about a web page currently being displayed by a browser. While the web browser is communicating with a web server to obtain the requested web page, client software communicates with a database metadata server to obtain metadata about the requested page. After the browser receives its requested information from the web server, it displays the requested web page in a conventional manner. The client concurrently displays its received metadata on the same computer as the web page, and concurrently with the web page. A preferred embodiment of the present invention opens a button bar in conjunction with the web page display. This button bar allows the user to view various portions of the metadata for the displayed web page.

47 Claims, 24 Drawing Sheets

OTHER PUBLICATIONS

Vannevar Bush, "As We May Think," The Atlantic Monthly, Jul. 1945, pp. 1–8.

San Jose Mercury News, "Peeping Tom," Jun. 1997, p. 3C.

Annotation Systems, reprinted from World Wide Web, URL=http://dri.cornell.edu/pub/davis/Annotation/others.html, Apr. 1997, pp. 1–4. [downloaded dated Apr. 24, 1997].

CoNote—Small Group Annotation Experiment, CoNote (Annotation) home page, reprinted from World Wide Web, URL=http:www.dri.cornell.edu/pub/davis/annotation.html, p. 1 of 1.[downloaded dated Apr. 24, 1997].

CoMentor Co–operative Learning. Poster from CVE '96University Of Notingham, Sep. 1996: reprinted from World Wide Web, URL=http://www.hud.ac.uk/schools/human+health/behavioural_science/comentor/CVI4/25/97er.htm. pp. 1–7.

Mike Burner, "Building an Archive of the World Wide Web, Crawling towards Eternity," Web Techniques, May 1997, pp. 37–40.

Vannevar Bush, "As We May Think," The Atlantic Monthly, Jul. 1945, pp. 1–8.

San Jose Mercury News, "Peeping Tom," Jun. 19, 1997, p. 3C.

Annotation Systems, reprinted from World Wide Web, URL=http://dri.cornell.edu/pub/davis/Annotation/others.html, Apr. 1997, pp. 1–4.

CoNote—Small Group Annotation Experiment, CoNote (Annotation) home page, reprinted from World Wide Web, URL=http:www.dri.cornell.edu/pub/davis/annotation.html, p. 1 of 1.

CoMentor Co–operative Learning, Poster from CVE '96University of Notingham, Sep. 1996; reprinted from World Wide Web, URL=http.//www.hud.ac.uk/schools/human+health/behavioural_science/comentor/CVI4/25/97er.htm, pp. 1–7.

* cited by examiner

Displaying metadata Interface

Button Bar Data Structure

OLE Implementation

DDE Implementation

**Sending URL from Client to Browser

"Where you are"

"Where to go next"

User-defined Links

Link pop-up -- Add a link

Add link -- Enter Location

Navigate then add link

Archive Retrieval

Communication between Client and DB Server

Client Side

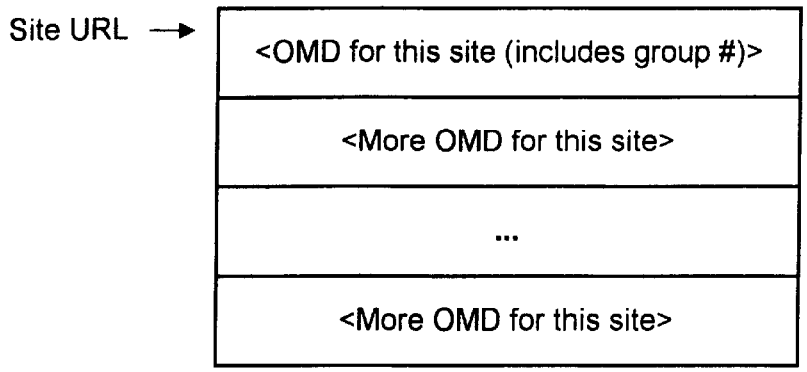
Format of Objective Metadata (per site basis)
Figure 16(a)
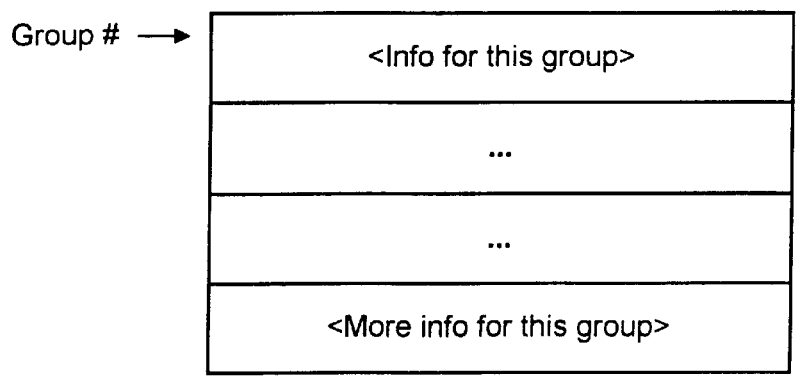
Format of group data (per site basis)
Figure 16(b)
Page URL →
| Clump # | Annotation # | Recommendation # | Archive flag |
|---|---|---|---|
| 4 hex digits (2 bytes) | 8 hex digits (4 bytes) | 8 hex digits (4 bytes) | 1 hex digits (1 byte) |
Format of CARA data (per page basis)
Figure 16(c)

| Clump # → | | | |
|---|---|---|---|
| 1 | URL of 1st related page | Tag of 1st related page | |
| | URL of 2nd related page | Tag of 2nd related page | |
| | ... | ... | Graphic # for Ad link |
| C | URL of Cth related page | Tag of Cth related page | Graphic # for Ad link |

Format of clump data (one clump)
Figure 16(d)

| Rec. # → | | |
|---|---|---|
| 1 | URL of 1st recommended page | Tag of 1st rec. page |
| | URL of 2nd recommended page | Tag of 2nd rec. page |
| | ... | ... |
| R | URL of Rth recommended page | Tag of Rth rec. page |

Format of recommendation data (one group)
Figure 16(e)

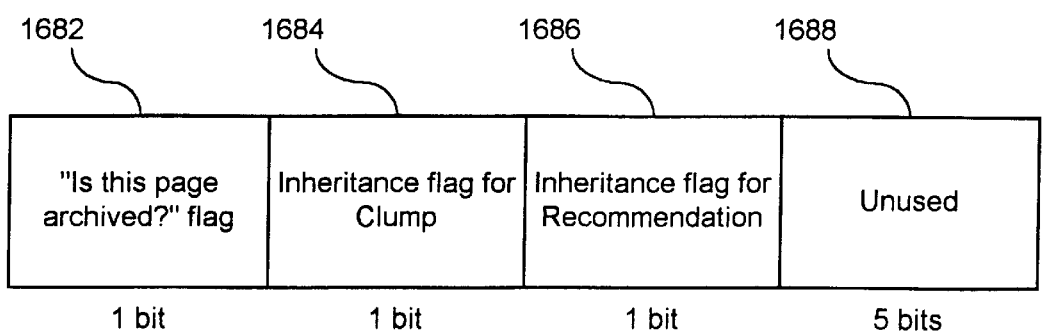

Format of archived flag
Figure 16(f)

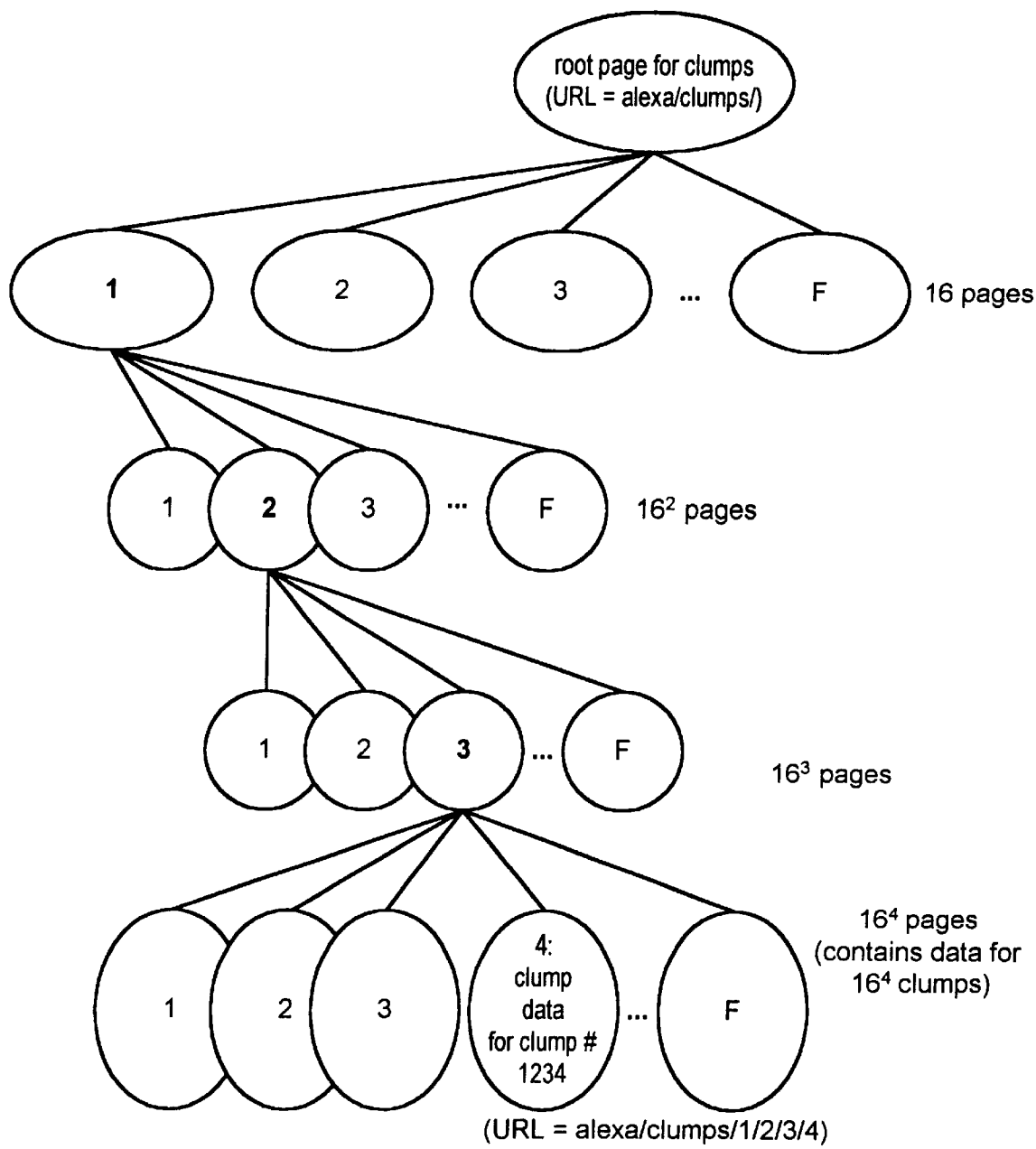

AUTOMATICALLY GENERATE AND DISPLAYING METADATA AS SUPPLEMENTAL INFORMATION CONCURRENTLY WITH THE WEB PAGE, THERE BEING NO LINK BETWEEN WEB PAGE AND METADATA

FIELD OF THE INVENTION

This application relates to the World Wide Web and, specifically, to a method and apparatus for augmenting a web page currently displayed by browser software with metadata relating to the displayed web page.

BACKGROUND OF THE INVENTION

In recent years, use of the Internet and the World Wide Web has increased greatly. Users having access to a computer, television access device, or some similar interface, can "browse" the web, viewing whatever information they choose. (This is usually done with a software program called a "browser"). As the web becomes more popular, however, the number of web pages has proliferated to the point that users often have a problem finding the information that they need or want.

Although the web has finally grown large enough to have information that is useful to many people, web users are frustrated. Information is difficult to find and the time required to view certain "slow" pages, which take a long time to load, is often unacceptable to users. In an attempt to address these frustrations, new types of services have arisen. For example, search engines and customized news filters have attracted millions of users. These services are generally free to users and are supported by advertising.

The existing approaches to delivering services on the Internet are inherently limited. Site-based services, such as search engines, rely on the user visiting their web site and "ping ponging" between their page and the pages the users may be interested in. "Server push" information delivery systems, such as filtered news services, suffer from the fact that they can select from only a small subset of the information available.

Currently, advertisers select web pages that they believe their target audience is likely to visit. For example, a luxury car company may advertise on a web site likely to be visited by high-income consumers. Alternately, certain web sties have tried to "target" their advertising based on the interests of the user. For example, certain search engine sites display different advertising for different users, depending on the search terms entered by the users. Thus, if a user enters the search term "car," the site displays ads targeted to car customers. One problem with such targeted advertising is that advertisers must still decide on which web sites to place their ads. Furthermore, the advertisers must decide which search terms are likely to be entered by their potential customers. Such targeted advertising is inexact at best. More importantly, many sites simply do not accept advertising. A car manufacturer's web site, for example, would not accept an ad from one of its competitors.

Another way of targeting advertising is for third-party advertising clearinghouses to develop a profile of a particular user visiting an affiliated web site, through instrumenting the web server software for the site. In this approach, when the user first visits a web site running this augmented server software, the server requests that the user's browser software permanently record an identifying string of characters (called a "cookie") in a file local to the user's personal computer. The server then records each web page visited on that site by the user and associates this usage trail with the cookie. The server software can then customize content (including advertising content) according to the interests evinced by the user's habits. Servers of different web sites all running this augmented software can pool data through the clearinghouse. The weakness of this approach is that it is only as useful as the fraction of servers running the augmented server software. The benefit to the user occurs only for a small percentage of his/her browsing experience.

In summary, the present structures for delivering web services are inadequate for both users and advertisers. Users need help in navigating the vast amount of information available on the web. What is needed is a way for users to see a "metaview" of available information and to be able to find the information that addresses their specific needs.

Advertisers, on the other hand, need a way to target users more specifically, without having to restrict their ad placement to the subset of sites willing to accept their advertising.

SUMMARY OF THE INVENTION

The present invention overcomes the problems and disadvantages of the prior art by maintaining a collection of metadata for web sites and for pages within the web sites. Client software runs concurrently with the browser and displays metadata for the web page being viewed by a user. A preferred embodiment of the present invention interfaces with a database server that maintains a regularly updated database of substantially all public web pages on the world wide web. In addition to the web archive itself, the database server also maintains various metadata information about some or all of the archived web sites and pages. This metadata includes changeable lists of related web pages ("Where to go next" information) and information about specific sites ("Where you are" information). The metadata also preferably includes identification of advertisements (or specially indicated links) that advertisers have paid to have associated with particular web pages or with particular groups or classes of web site. The database server also maintains usage trails for users, which reflect, for example, general statistics on numbers of visits per site.

In a preferred embodiment of the present invention, a user computer (or other network access device) contains conventional browser software (hereinafter called a "browser") and specially-built client software (hereinafter called a "client") that interfaces with the browser. Preferably, the client is able to interface with the browser without altering the browser.

When a user, via the browser, asks to view a web page, the client software detects the request (or is notified of the request by the browser). While the web browser is communicating with a web server to obtain the requested web page, the client communicates with the database server to obtain metadata about the requested page. After the browser receives its requested information from the web server, it displays the requested web page in a conventional manner. The client then displays its received metadata on the same display as the web page, and concurrently with the web page. Thus, the user can view the web page and metadata about the web page at the same time. A preferred embodiment of the present invention opens a button bar in conjunction with the web page display. This button bar allows the user to view various portions of the metadata for the displayed web page in greater detail.

It is understood that while the preferred embodiment of the invention describes the web as using the current public standards for serving, transporting, and displaying information, this in no way limits the scope of the invention to those current standards. For example, the web currently uses free-standing applications known as browsers to format and present information on a display, but in the future, the functionality of the browser may become absorbed by the operating system. This scope of this invention is understood to cover such cases.

In accordance with the purpose of the invention, as embodied and broadly described herein, the invention relates to a method of presenting information that augments the information on a web page being displayed on a display device by a browser, comprising the steps, performed by a data processing system, of: receiving information identifying the web page to be displayed; sending, to a metadata server, a request for metadata in accordance with the received information; and displaying, on the same display device as the web page and concurrently with the web page, metadata received in response to the request.

In further accordance with the purpose of the invention, as embodied and broadly described herein, the invention relates to a data structure in a memory of a metadata server, comprising: a hierarchy of information, where a URL for each page in a web site corresponds to a level in the hierarchy of information, and wherein each level in the hierarchy of information corresponds to a respective page in the web site, each item in the hierarchy of information containing metadata about a respective page in the web site.

In further accordance with the purpose of the invention, as embodied and broadly described herein, the invention relates to a method of directing a user to at least one web page related to a web page displayed on a display device by a browser, comprising the steps, performed by a data processing system, of: receiving information describing the contents of the displayed web page; sending, to a metadata server, a request for an identification of the related web page in accordance with the contents of the displayed web page; and displaying, on the same display device as the web page and concurrently with the web page, metadata about the web page, the metadata received in response to the request.

Objects and advantages of the invention will be set forth in part in the description which follows and in part will be obvious from the description or may be learned by practice of the invention. The objects and advantages of the invention will be realized and attained by means of the elements, method steps and combinations particularly pointed out in the appended claims and equivalents.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIGS. 16(a) through 16(f) show example formats of metadata.

FIG. 23 shows an example of CARA metadata.

FIG. 24 shows an example of a method performed by the database server to translate a clump number to the URL (Uniform Resource Locator) of a web page containing the data for the clump.

DESCRIPTION OF THE PREFERRED EMBODIMENTS

Reference will now be made in detail to preferred embodiments of the invention, examples of which are illustrated in the accompanying drawings. Wherever possible, the same reference numbers will be used throughout the drawings to refer to the same or like parts.

I. System Overview

The present invention allows a user to view metadata about a page being viewed via a browser. Specifically, client software executing on the same system as the browser obtains metadata about the site/page being viewed and displays it concurrently with the page being displayed by the browser. This information includes "Where you are" information about the site/page and "Where can I go next" information, suggesting related pages that the user might want to view. In addition, advertisers can request that their ads be displayed to users viewing certain pages or certain types of pages. The following paragraphs provide an overview of the system.

Figure 1:
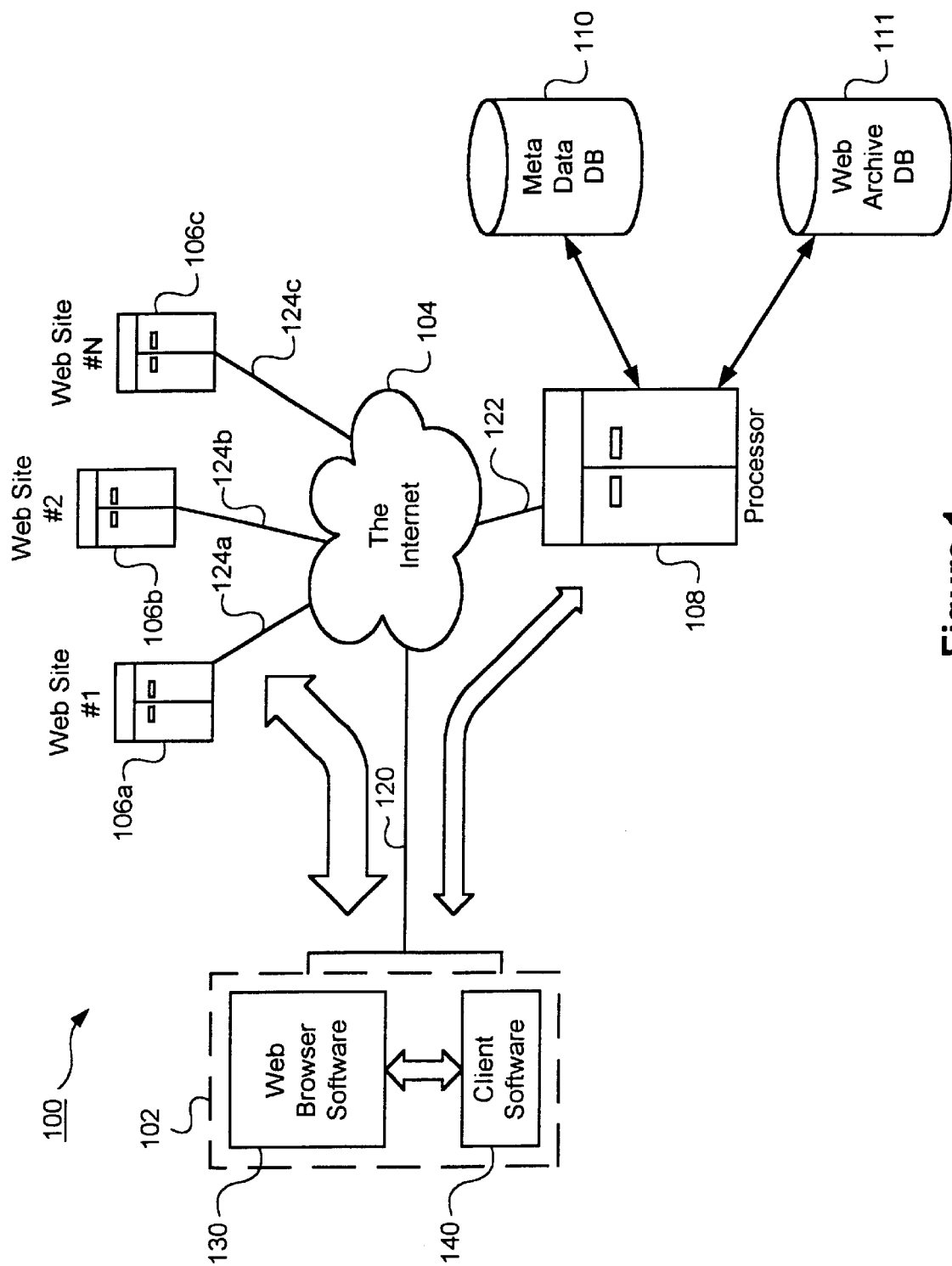
FIG. 1 is a block diagram of a network system used in accordance with a preferred embodiment of the present invention.

FIG. 1 is a block diagram of a network system 100 in accordance with a preferred embodiment of the present invention. FIG. 1 includes a user computer 102, which is connectable to a plurality of web sites (also called web servers) 106 via a network 104, such as the Internet. Computer 102 preferably is connected to the network 104 via a network connection, such as a modem or network interface card. In the described embodiment, user computer 102 is an IBM PC, or any other appropriate data processing system, running the Windows 95 operating system. It will be understood that the present invention can be implemented using any appropriate type of computer or hardware platform. "Windows 95" is a trademark of Microsoft Corporation of Redmond, Wash.

Browser 130 preferably is a conventional web browser, such as the Netscape Navigator browser available from Netscape Communications Corp. of Mountain View California or Internet Explorer, available from Microsoft Corporation, both of which are operable with the Windows 95 operating system. "Netscape Navigator" is a trademark of Netscape Communications Corp. It should be understood that the present invention may be implemented using any conventional browser software capable of performing the main client interface functions described herein. Client 140 and browser 130 communicate to allow the client to determine when certain functions are performed by browser 130. It should be understood that server 108 can communicate simultaneously with a number of clients 140. Although only a single server 108 is shown, it should be understood that there may be multiple servers 108.

User computer 102 is also connectable to a database server 108 via a network 104, such as the Internet. Database server 108 (which is also called a "metadata server") is coupled to a database 110 containing metadata and to a database 111 containing an archive of web pages. Database 110 contains metadata about one or more of the web sites 106. Metadata is any data that is related to a web site. Database 111 preferably contains an archive of the contents of one or more web sites 106. In a preferred embodiment of the present invention, database 111 contains an archive of all public web pages in the world wide web as of a certain range of dates (i.e., the dates on which the web was crawled and archived). This archived data is also called "crawl data" because it is preferably collected by a program called a "web crawler." Any conventional web crawler can be user to collect the crawl data. Database 111 contains an archive of the world wide web for at least one range of dates and preferably for a plurality of ranges of dates. Thus, it should be possible to obtain web pages no longer exist on the web from database 111.

It is understood that the size and scale of the components of the described embodiment depend upon the size of the publicly-available web. For purposes of illustration, if the public web is comprised of 500,000 unique web sites, where each site may contain an average of a few hundred web pages, then a snapshot of the web would total 100 million pages. The metadata database appropriate to size and page data of such a system would be on the order of 100 Gigabytes. The web archive of the content of these web pages would require approximately 10 Terabytes of storage. Access time for metadata stored on the hard drive in database 110 is approximately 15 milliseconds. Secondary storage in database 110 is used, for example, to store older versions of the archived web pages in database 110. This secondary storage can be, for example, an automated digital tape cartridge library from Storage Technology Corporation, of Louisville, Colo. Access time for a particular tape is on the order of four minutes. Various other media can be used to hold the data of databases 110,111 without departing from the spirit and scope of the present invention.

Figure 2:
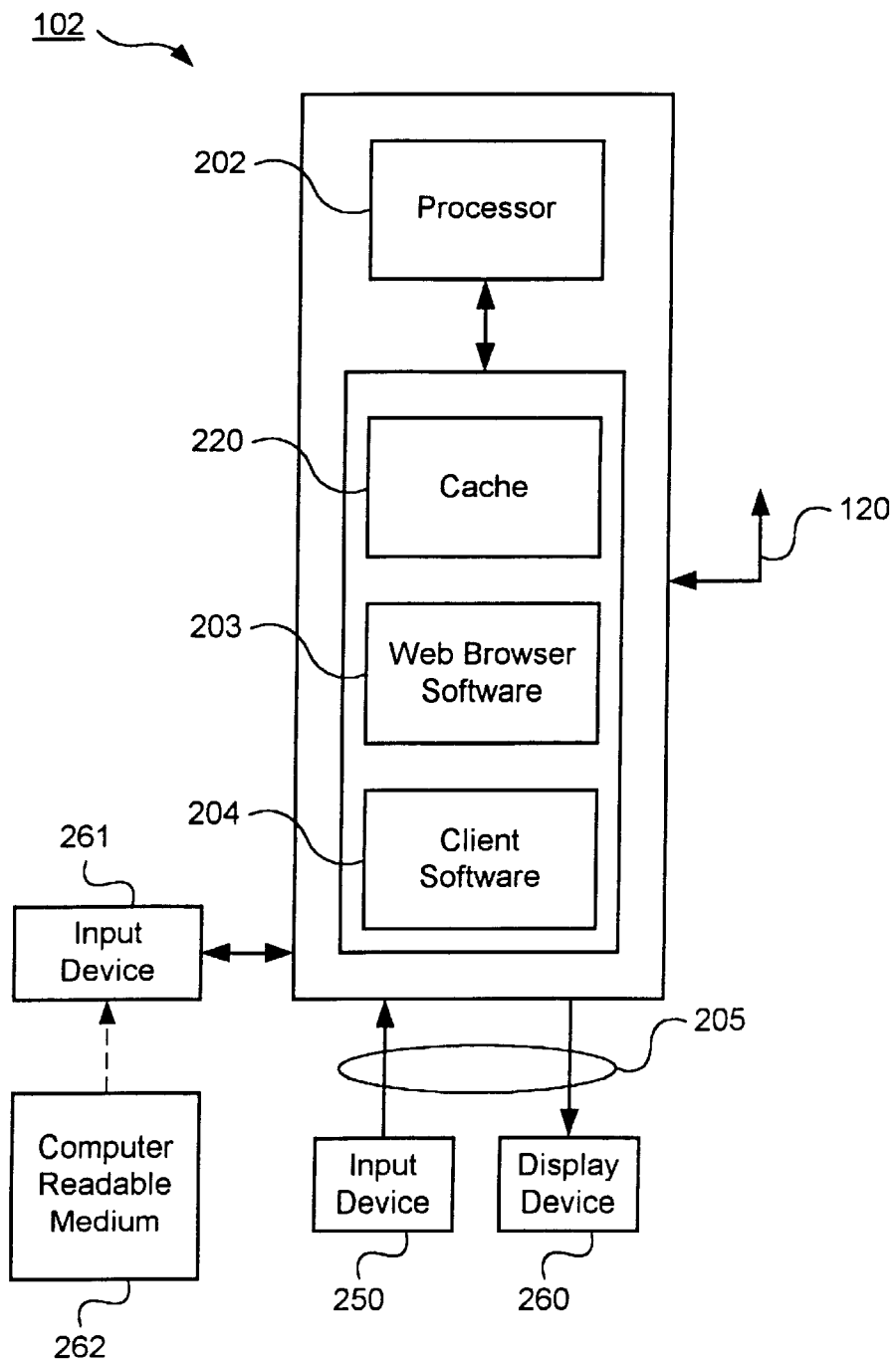
FIG. 2 is a block diagram of a data processing system used in accordance with a preferred embodiment of the present invention.

FIG. 2 is a block diagram of a user computer system 102 in accordance with a preferred embodiment of the present invention. In FIG. 2, computer system 102 includes a processor 202; a memory 204; input/output lines 205; an input device 250, such as a keyboard, a mouse, and a voice input device; and a display device 260, such as a display terminal. Computer 102 also includes an input device 261, such as a floppy disk drive, CD ROM reader, or DVD reader, that reads computer instructions stored on computer readable medium 262, such as a floppy disk, a CD ROM, or a DVD drive. These computer instructions are the instructions of e.g., client software 140. Memory 204 also includes web browser 130, as described above. User computer 102 preferably also includes a cache memory 220, which is preferably part of memory 204, but which can also be implemented as a separate memory. Cache 220 is used, for example, to store metadata read by client 140 (and to store web pages read by browser 130) in order to avoid the access times associated with web servers 106 and database server 108.

A person of ordinary skill in the art will understand that memory 204 also contains additional information, such as application programs, operating systems, data, etc., which are not shown in the figure for the sake of clarity. It also will be understood that computer system 102 can also include numerous elements not shown in the Figure for the sake of clarity, such as disk drives, keyboards, display devices, network connections, additional memory, additional CPUs, LANs, input/output lines, etc.

In the following discussion, it will be understood that the steps of methods and flow charts discussed preferably are performed by processor 202 (or similar processors) executing instructions stored in memory, such as instructions of client software 140, browser software 130, and software executed by database server 108. It will also be understood that, the invention is not limited to any particular implementation or programming technique and that the invention may be implemented using any appropriate techniques for implementing the functionality described herein. The described embodiment of the client software is written in the C++ programming language and executes under the Windows 95 operating system, but the invention is not limited to any particular programming language and can be implemented in other programming languages (such as Java) or using other operating systems.

Furthermore, although the present invention is described in terms of client software executing on a personal computer, it should be understood that the present invention can be implemented using any access device capable of interfacing to the Internet, such as a television-based web access device, a network computer, a personal digital assistant, or a smart cell phone. Lastly, although the present invention is described in terms of web pages viewed over the Internet, it should be understood that the present invention could be implemented to view web pages viewed over any appropriate network, such an a private intranet, or a public network other than the Internet. The present invention could also be used to implement a CD ROM (or similar medium) containing an "Internet tour" of popular web pages. In this embodiment, a number of web pages are stored on the CD ROM along with metadata for the pages. The browser fetches web pages from the CD ROM and the client fetches metadata from the CD ROM.

II. Obtaining Metadata for a New Page

A. Overview

Figure 3:
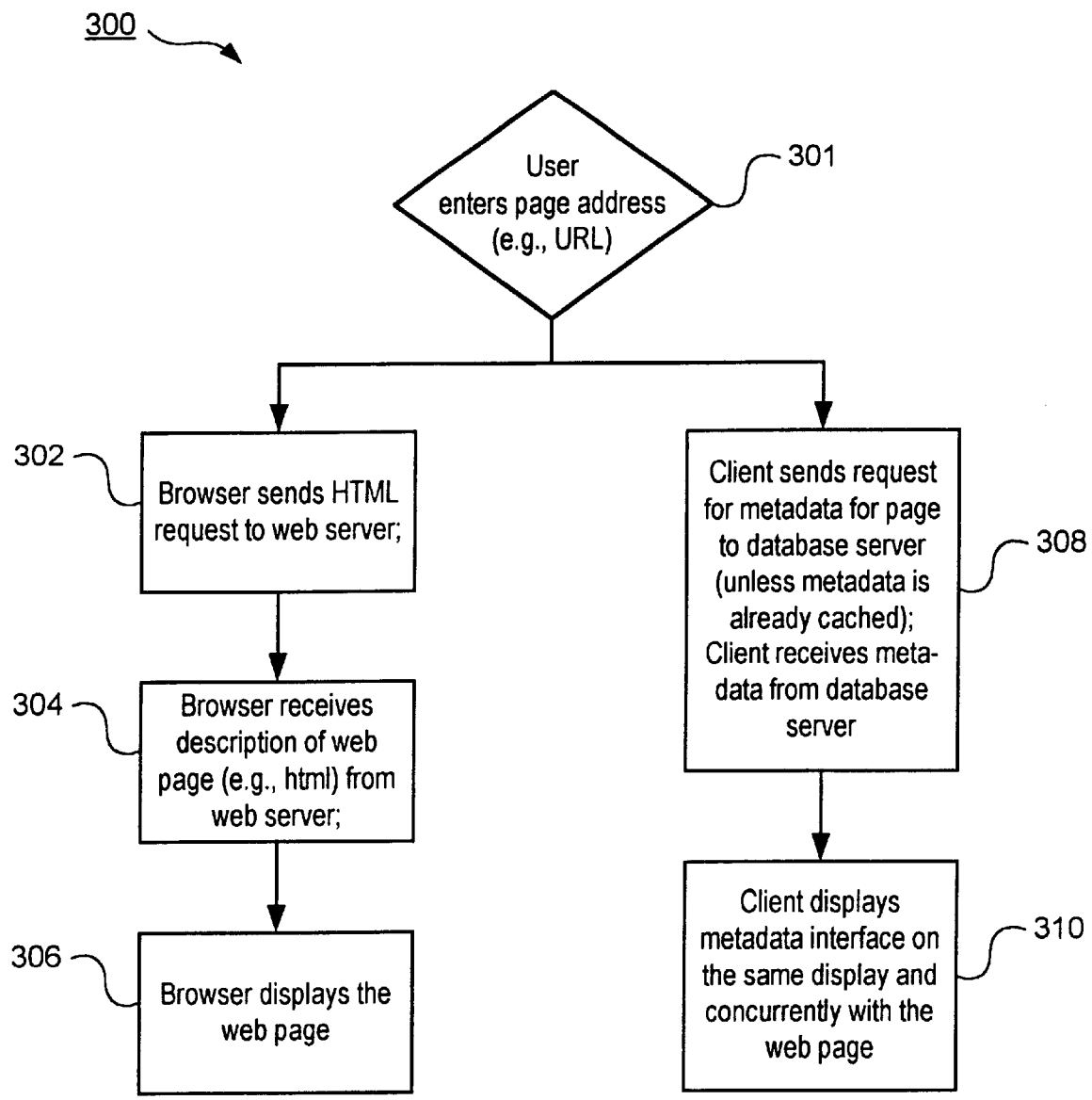
FIG. 3 is a flow chart showing steps performed by browser software and by client software when the user displays a new page on a display of FIG. 2.

When the user chooses to view a new page via browser 130, client 140 automatically fetches metadata for the page and displays it while the browser displays the web page. FIG. 3 is a flow chart showing steps performed by browser software and by client software when the user asks browser 140 to display a new page. In step 301, a user decides that he wishes to view a web page and enters the address of the web page into browser 140. This address can be, for example, an URL (Uniform Resource Locator). The user can use any other appropriate method of informing browser 140 that it is to obtain and display a new web page, such as typing the address into browser 140, or clicking on an embedded link to the web page. Once browser 140 gets the web page address, it communicates the web page address to client 140. The exact method used to communicate between browser 130 and client 140 varies somewhat for different implementations of the present invention, examples of which are described below in connection with FIGS. 6(a) through 6(c) the HyperText Markup Language (HTML) for the web page.

Once browser 130 gets the web page address, browser 130, in step 302, requests the web page by sending, e.g., an HTTP (hypertext transfer protocol) request, to one of web servers 106. In step 304, browser 130 receives a description of the web page (e.g., the HTML for the web page) from the web server 106. In step 306, browser 130 displays the web page requested by the user.

While browser 130 is fetching and displaying the web page requested by the user, client 140 is requesting and displaying metadata about the web page. In step 308, client 140 sends a request for metadata for the requested page to database server 108. A preferred embodiment of the present invention collects and stores "Where you are" metadata in database 110 on a site basis. Related links are stored in database 110 for each page. As discussed above, a preferred embodiment of the present invention includes a cache local to the user's personal computer. If the user switches between pages but stays on the same site, the client software can re-use the cached site metadata without requesting new information from the server. It can also request to see if the page-based recommendations are any different from the previous page. If they are the same, no new data is requested, and the cached copy is used. If they are different, the new data is retrieved from the server."

In step 308, client 140 receives the metadata for the site from database server 108. In step 310, client 140 displays a metadata interface, such as a button bar 405 of FIG. 4, on the same display screen and concurrently with the web page.

In the described embodiment, no modifications or alterations are made to browser 130, which is a conventional browser. In addition, no modifications are made to the HTML code for the page that is displayed by the browser. Thus, for example, while button bar 405 is displayed concurrently with the web page, button bar 405 is not a part of the displayed web page. The contents of button bar 405 are generated by client 140 in accordance with the metadata requested by client 140 and received from database server 108. Alternately, the present invention may be implemented as an extension of the browser or as browser "plug-in" software.

Another alternate implementation uses a "thin client" and a proxy server. A thin client is a small-sized piece of client software operating on computer 102. A conventional proxy server is a piece of software residing between the browser and the web server 106 for purposes of filtering or providing a cache of frequently-requested pages that can be shared by multiple users. The browser is set up to send all requests for data to the proxy server, which can honor the request, deny the request, or serve a copy of its data from its cache. In the "thin client" implementation of the present invention, the proxy server also sends a request for metadata to the server 108, in accordance with the URL (or content) of the requested page and sends the received metadata to the thin client for display concurrently with the page displayed by the browser.

An alternative "thin client" may be implemented without use of a conventional proxy server, using a secondary instance window of the conventional web browser and the inter-window communication protocols supported by the browser software. One example of an inter-window communication protocol is the JavaScript language implemented in the Netscape browser (JavaScript is a trademark of Netscape Communications Corporation of Mountain View, Calif.). This secondary browser window can monitor the URL and contents of the primary window, and then connect to the central metadata server 108 to request information to be displayed. This secondary browser window then takes on the role of the "button bar" described earlier and below. It can use whatever document formats, programming languages, or plug-ins that are supported by the browser.

It should be understood that, although the described embodiment displays metadata in accordance with an URL (Uniform Resource Locator) entered by the user into the web browser, other preferred embodiments may also display other types of metadata based, for example, on the HTML content of the page. In these alternate embodiments, the client can obtain metadata from server 108 based on the content of the page on every occasion, or only when the server 108 has no other metadata for the page.

Figure 4:
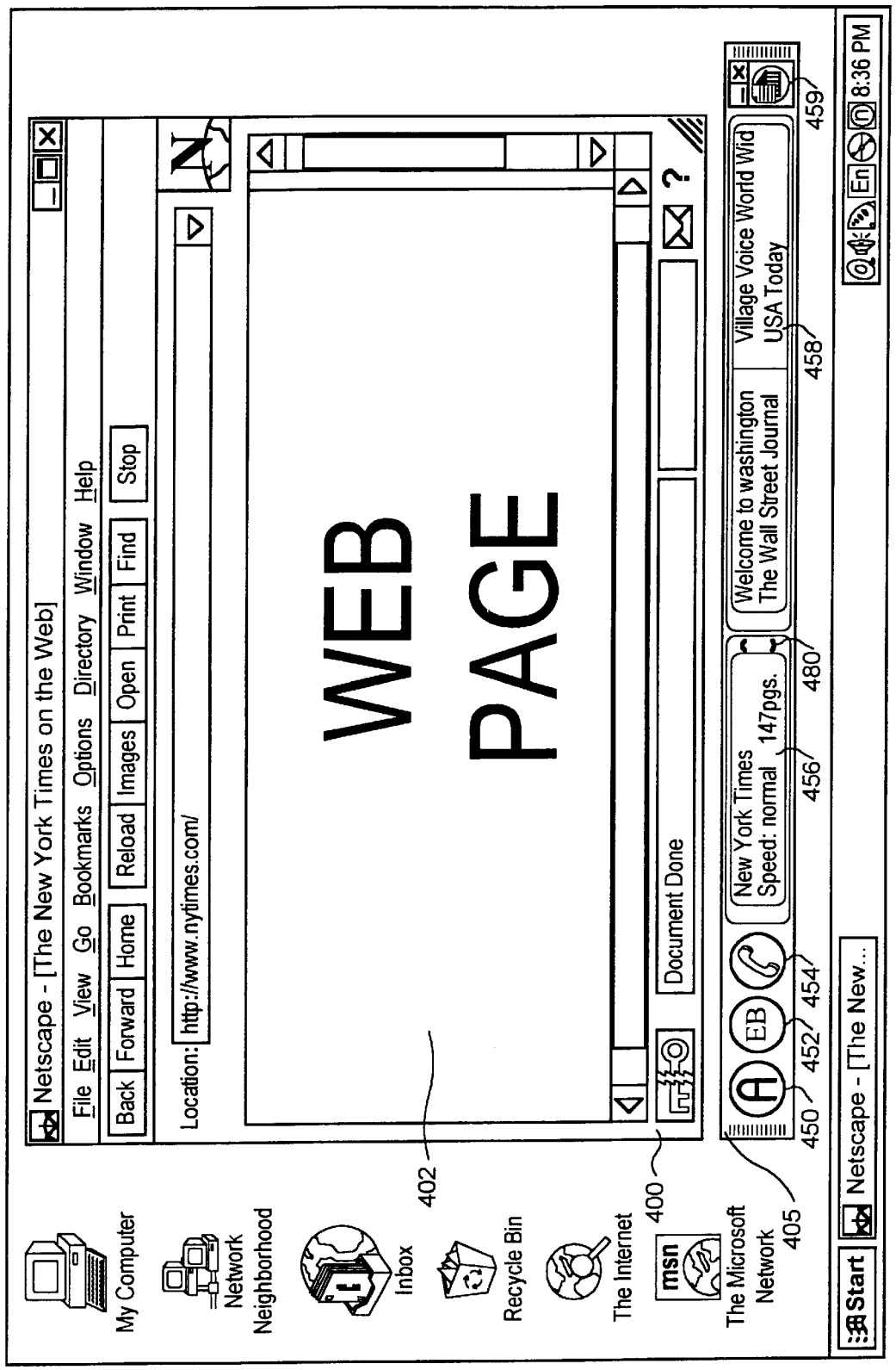
FIG. 4 shows an example of a browser displaying a web page while a metadata bar displays associated information.

FIG. 4 is an example of a web page 400 displayed by a browser and of a metadata button bar 405 displayed in accordance with a preferred embodiment of the present invention. The types of metadata that a user can view using button bar 405 varies as different sites are viewed by the user. In the example, web page 400 contains a graphic 402. Web page 400 is displayed by browser 130. Button bar 405 is displayed by client 140.

In the described embodiment, button bar 405 in FIG. 4 is displayed either as "docked" (its position is kept fixed relative to the edge of the browser window or computer monitor) or "floating" (where the user is free to position the button bar anywhere on screen, floating above the browser window if desired). Methods of implementing floating and docked button bars in a windows-type environment are known to persons of ordinary skill in the art and will not be discussed herein.

Button bar 405 includes a homepage icon 450; a reference work icon 452; a contact list icon 454, a "Where you are" area 456; a "Where to go next" area 458; and an archive icon

459. Clicking on icon 450 generates a popup menu (not shown) that allows the user to go to a home page of the company marketing the client software and that also allows the user to change their preferences. Clicking on icon 452 opens a popup menu (not shown) that allows a user to access an online reference work, such as an encyclopedia or similar references materials. Clicking on the contact list icon causes the display of a list of users currently on line, filtered in various ways.

One method of filtering is for the user to establish a list of friends or associates, all of whom are registered with the central database server 108. The contact list can then display which of their friends or associates are currently on line. The users can then establish communications with each other via a tool that allows the exchange of instantaneous messages. This level of contact list service is available from America Online, Inc., of Reston, Va. or Mirabilis Corporation of New York City, N.Y. Another method of filtering which user names are to be displayed is to display those users who are on line and presently viewing the same web site or web page. A means whereby users could choose to remain invisible or block their visibility to or messages from another user can be provided. Another use of contact lists of friends and associates is to establish which users have permission to view annotations made by the user about a particular web page and kept on the database server 108. Annotations are discussed in more detail below.

"Where you are" area 456 preferably contains a sampling of the metadata about the currently displayed web site. Any combination or subset of available metadata can be displayed in this area, since more complete metadata is displayed in a popup menu, as described below. "Where to go next" area 458 includes a sampling of links to pages related to the currently displayed page. These links can be specified both by the system and by the user. These links can also contain "paid pointers," as described below. "Where you are" area 456, "Where to go next" area 458, and archive icon 459 are each described in further detail below in connection with FIGS. 7–12.

As described above, the present invention allows the user to display metadata about the page currently being viewed via a browser. The metadata is displayed on the screen or display device concurrently with the page. Client software 140 filters metadata received from server 108 and displays it.

Figure 5A:
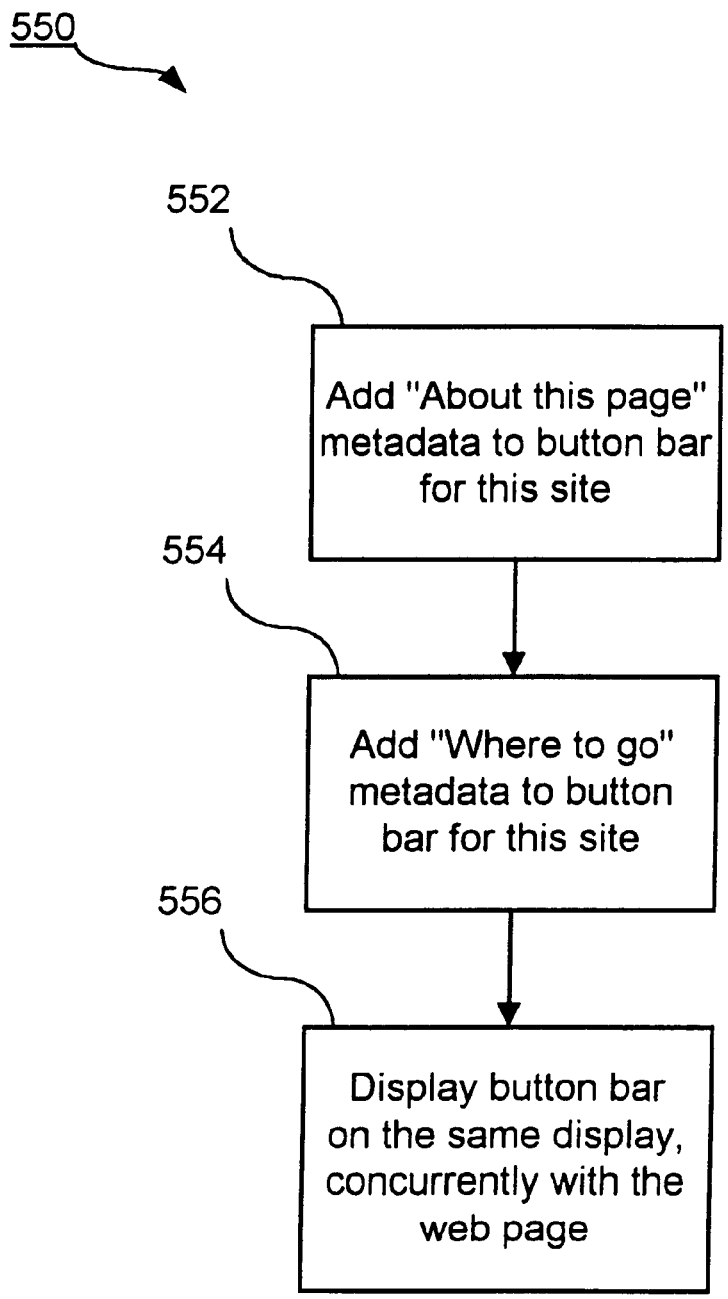
FIG. 5(a) is a flow chart showing steps performed by the client after it has received metadata for a new page.
Figure 5B:
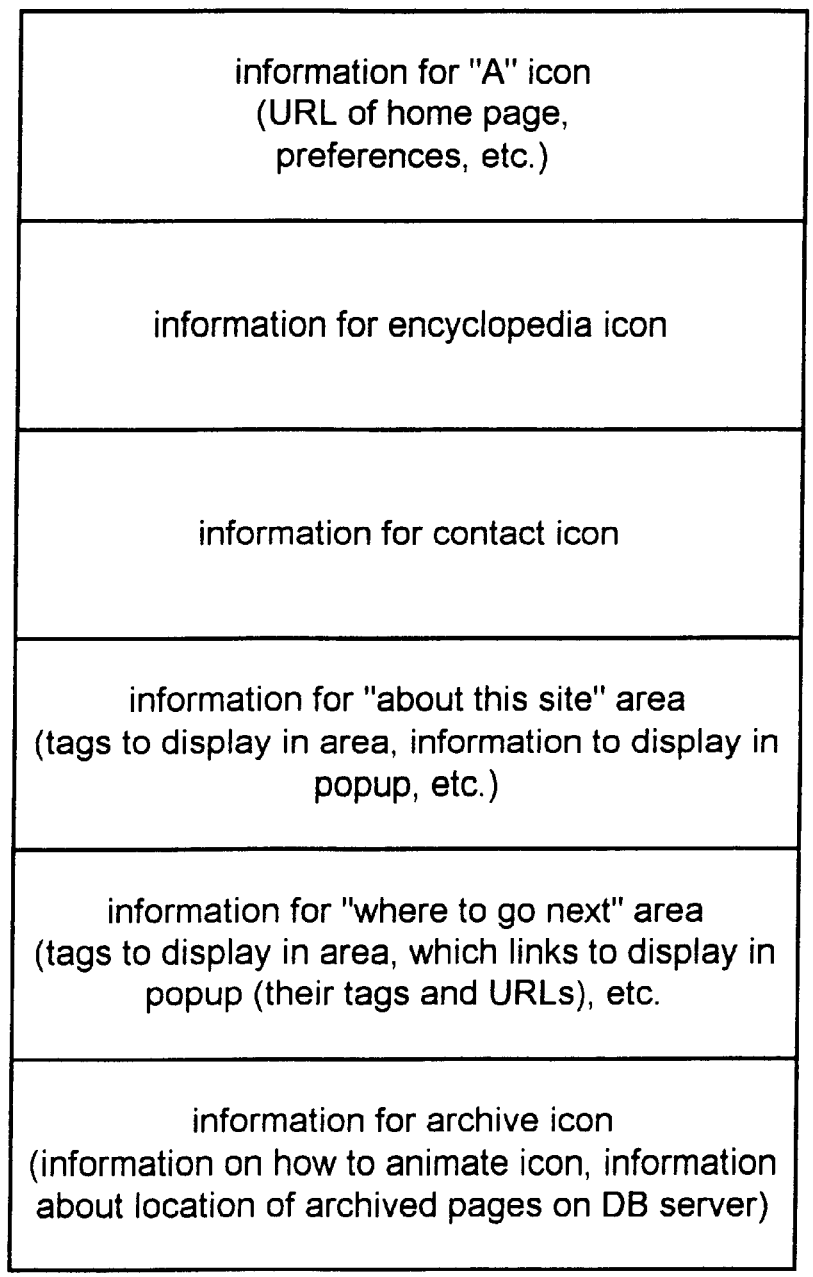
FIG. 5(b) shows an example of a data structure representing the button bar of FIG. 4.

FIG. 5(a) is a flow chart showing steps performed by the client after it has received metadata for a new site or page. The steps of FIG. 5(a) show further details of step 310 of FIG. 3. For example, in step 552 of FIG. 5(a), client 140 adds "Where you are" metadata to a data structure (see FIG. 5(b)) representing an appearance of button bar 405. In step 554, client 140 adds "Where to go next" metadata to the data structure of FIG. 5(b). Although not shown in the Figure, the data structure can contain information that does not immediately affect the appearance of the button bar. For example, the button bar data structure may include information about related links that is only displayed when the user invokes a popup menu, as described below.

B. Communication Between the Browser and the Client

The described embodiment of the present invention relies on implementation details specific to the Windows 95 operating system. Furthermore, the client of the described embodiment uses different browser interfaces to communicate with different browsers. The following description of implementation details is provided by way of example only and is not intended to limit the scope of the present invention.

The following paragraphs discuss two preferred embodiments of the present invention. In a first preferred embodiment, client 140 is implemented to run with a browser, such as the Netscape Navigator browser, that includes an OLE (Object Linking and Embedding) interface. In a second preferred embodiment, client 140 is implemented to run with a browser, such as either the Netscape Navigator browser or the Microsoft Internet Explorer browser, that includes a DDE (Dynamic Data Exchange) interface. Note that the OLE implementation also uses some DDE calls (see FIG. 6(c)).

Figure 6A:
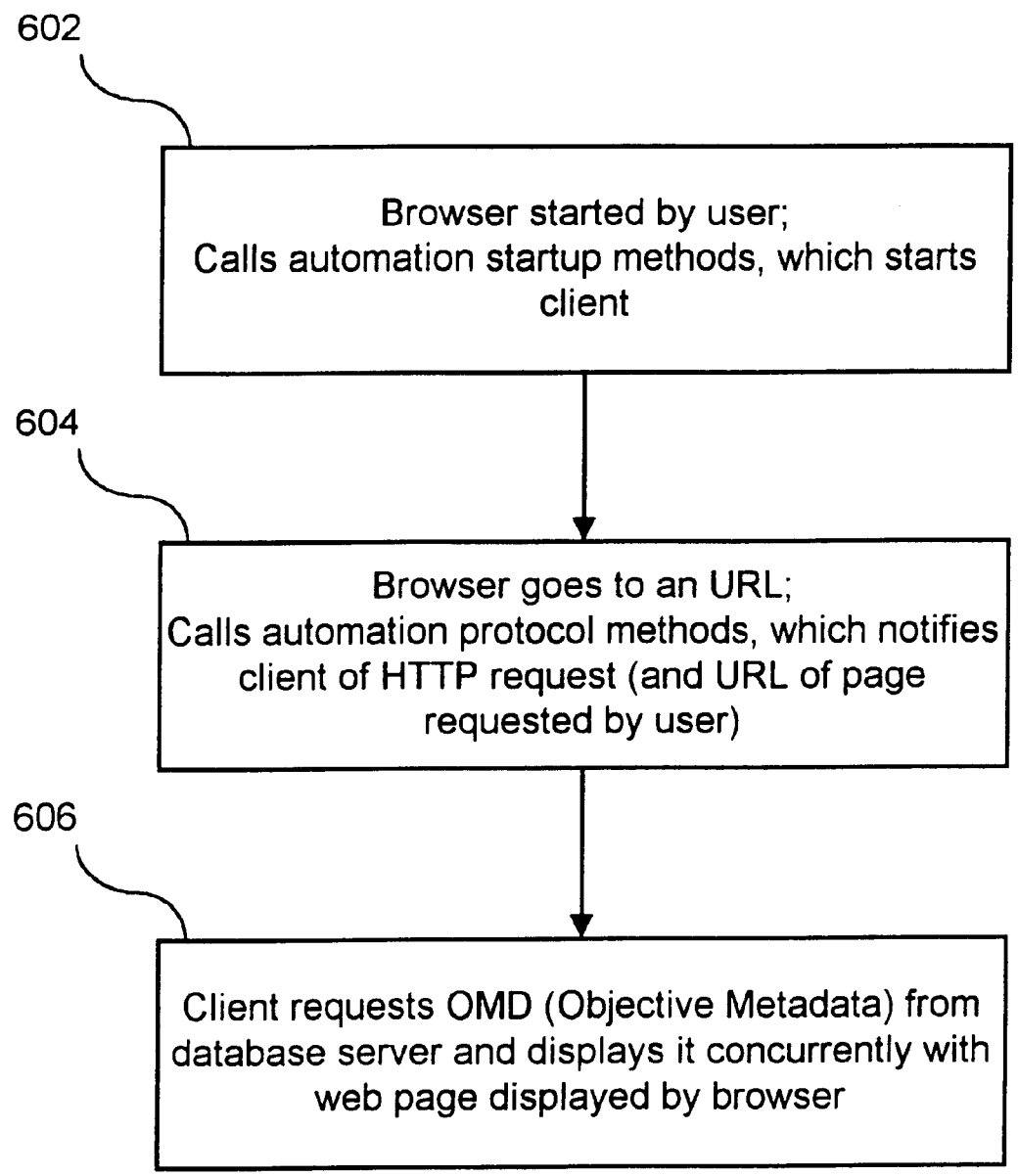
FIG. 6(a) through 6(c) are flow charts showing examples of techniques used by the client to communicate with the browser in a preferred embodiment of the present invention.

FIG. 6(a) is a flow chart showing examples of techniques performed by the client to communicate with the browser and retrieve metadata in a preferred embodiment of the present invention. Note that, in this embodiment, it is possible to set up the browser so that it automatically starts the client whenever the browser is started. This feature is advantageous, but not required, in the present invention. It should be understood that the following examples are provided for purposes of explanation only and are not intended to limit the scope of the present invention in any way. The client software could also detect which server the browser is attempting to contact and which page is being retrieved by interacting with the PC's system software that drives the network interface card or modem. For example, the system software can be instrumented at the Network Device Interface Specification (NDIS) layer, which provides an abstract interface to all networking protocols, to obtain this information. Most of the client communication with server 106 can alternately be off-loaded to a proxy server (as described above).

In step 602, the user starts browser 130, which calls an OLE automation startup method that starts client 140. (The client has been previously registered with the browser using a known OLE method). In step 604, when the user enters an URL (or clicks on a link, etc.), the browser calls an automation protocol method, which automatically notifies the client that an HTTP request has been made. In step 606, the client requests OMD (objective metadata) from database server 108 and displays the received metadata (see, for example, FIG. 4). Note that, even though all other steps of FIG. 6(a) use the OLE interface, client 130 still uses a DDE request to communicate a user-entered URL to the browser (as shown in FIG. 6(c)).

Figure 6B:
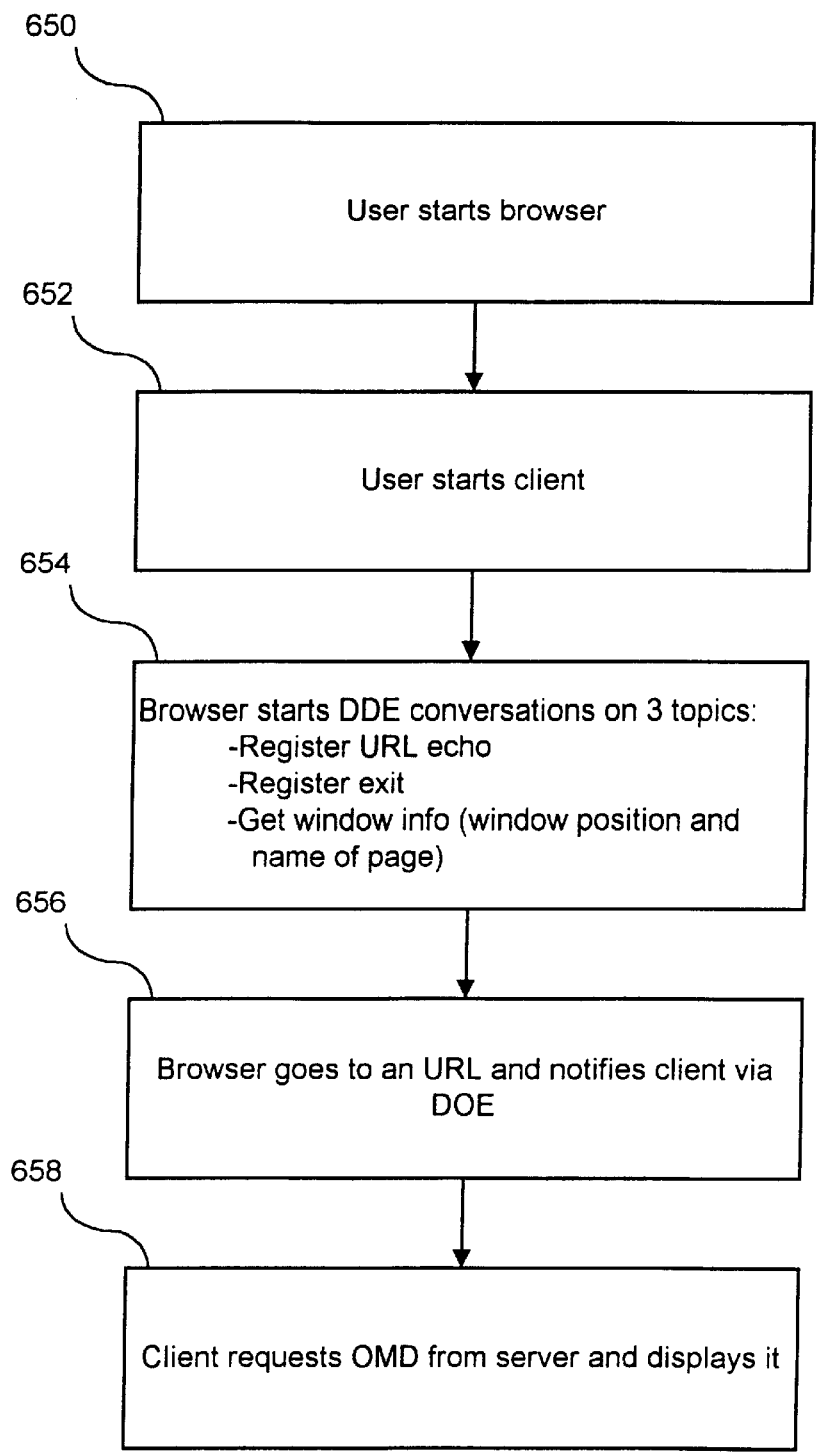
Figure 6C:
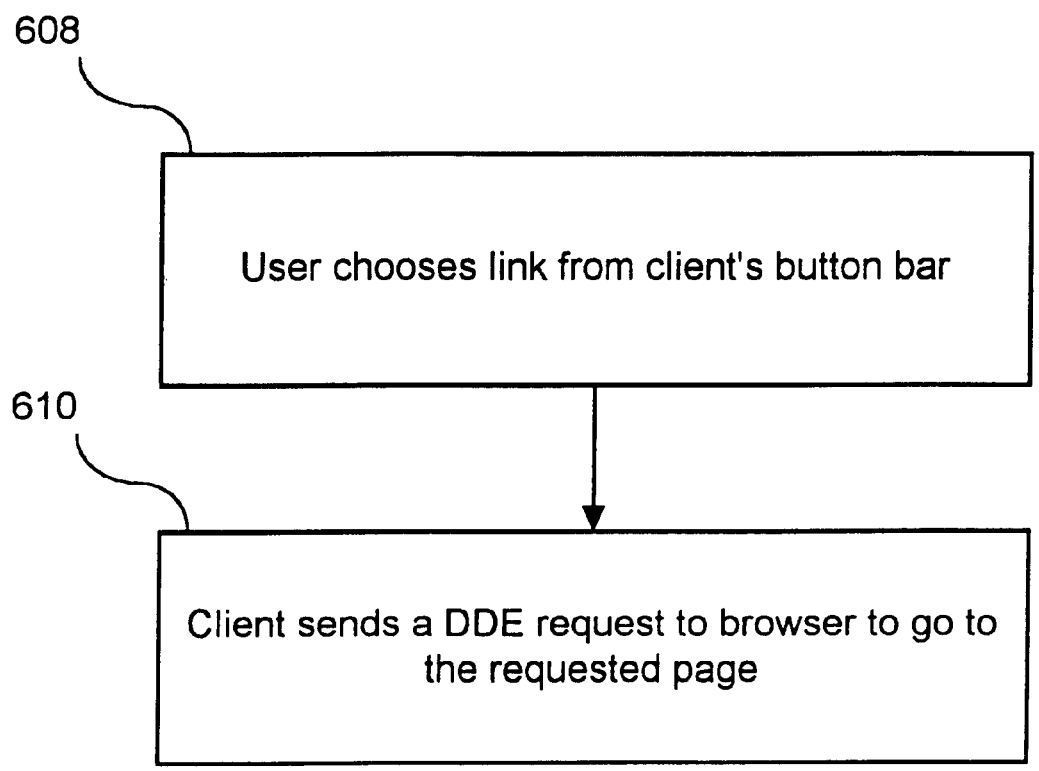

FIG. 6(b) is a flow chart showing steps performed by the client to communicate with the browser and retrieve metadata in another preferred embodiment of the present invention. In steps 650 and 652, the user starts browser 130 and client 140. In step 654, the browser starts DDE conversations on three topics: 1) registration of URL echo, 2) registration on exit, and 3) get window information (such as the window position and the title tag of the page). Step 654 ensures that client 140 will be notified whenever any of the registered events occur. In step 656, the browser requests a user-indicated page from one of web servers 106. In step 658, the client requests OMD (Objective Metadata) from database server 108.

In the implementation of either FIG. 6(a) or 6(b), once the metadata is displayed, the user can select a link in the metadata. In step 608, when the user chooses a link from the button bar, the client, in step 610, sends a DDE request to the browser to go to/display the requested page. Note that, at this point, client 140 (not the user) is driving the browser 130.

Client 140 must communicate the user-specified URL to browser 130 so that the browser can request the page from server 106.

C. Button Bar

1. "Where you are" Data

Figure 7:
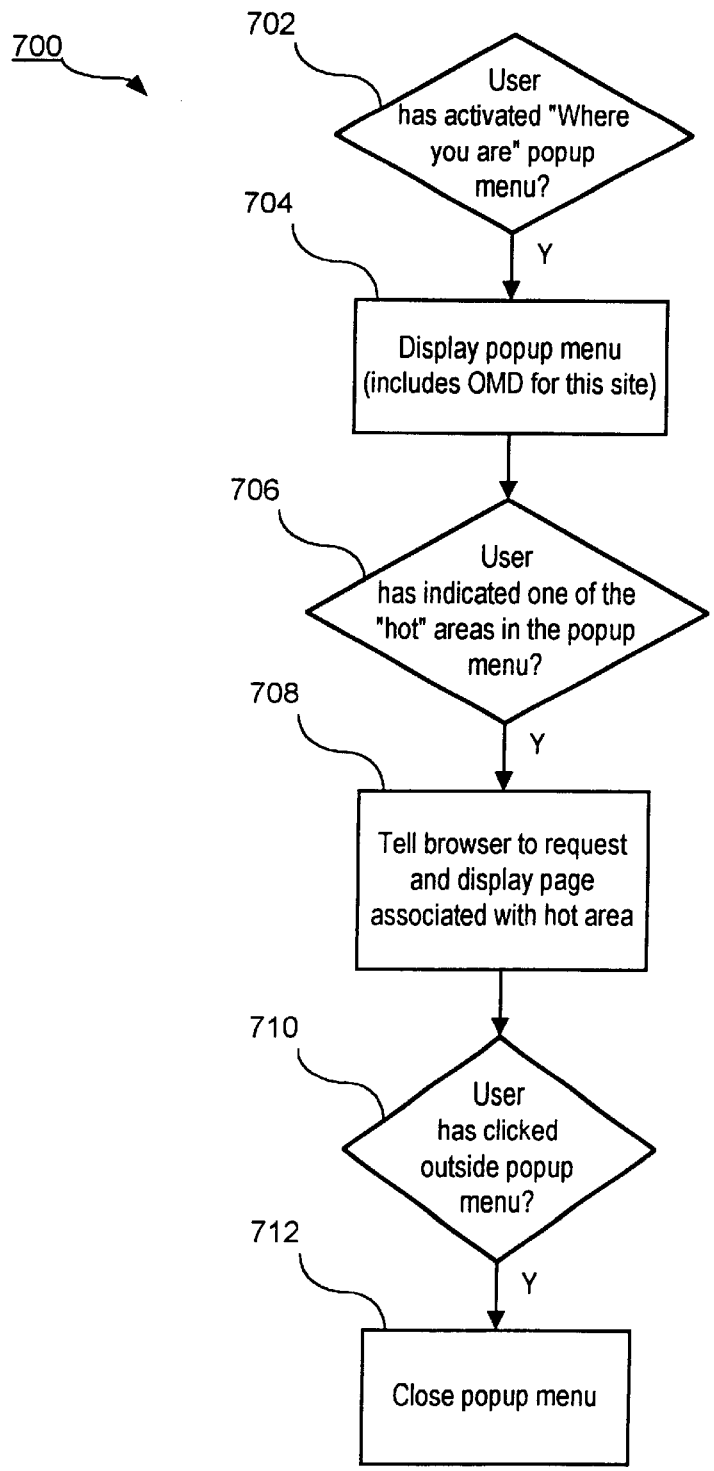
FIG. 7 is a flow chart showing steps performed by the client when a user activates an "Where you are" popup menu from the button bar.
Figure 8:
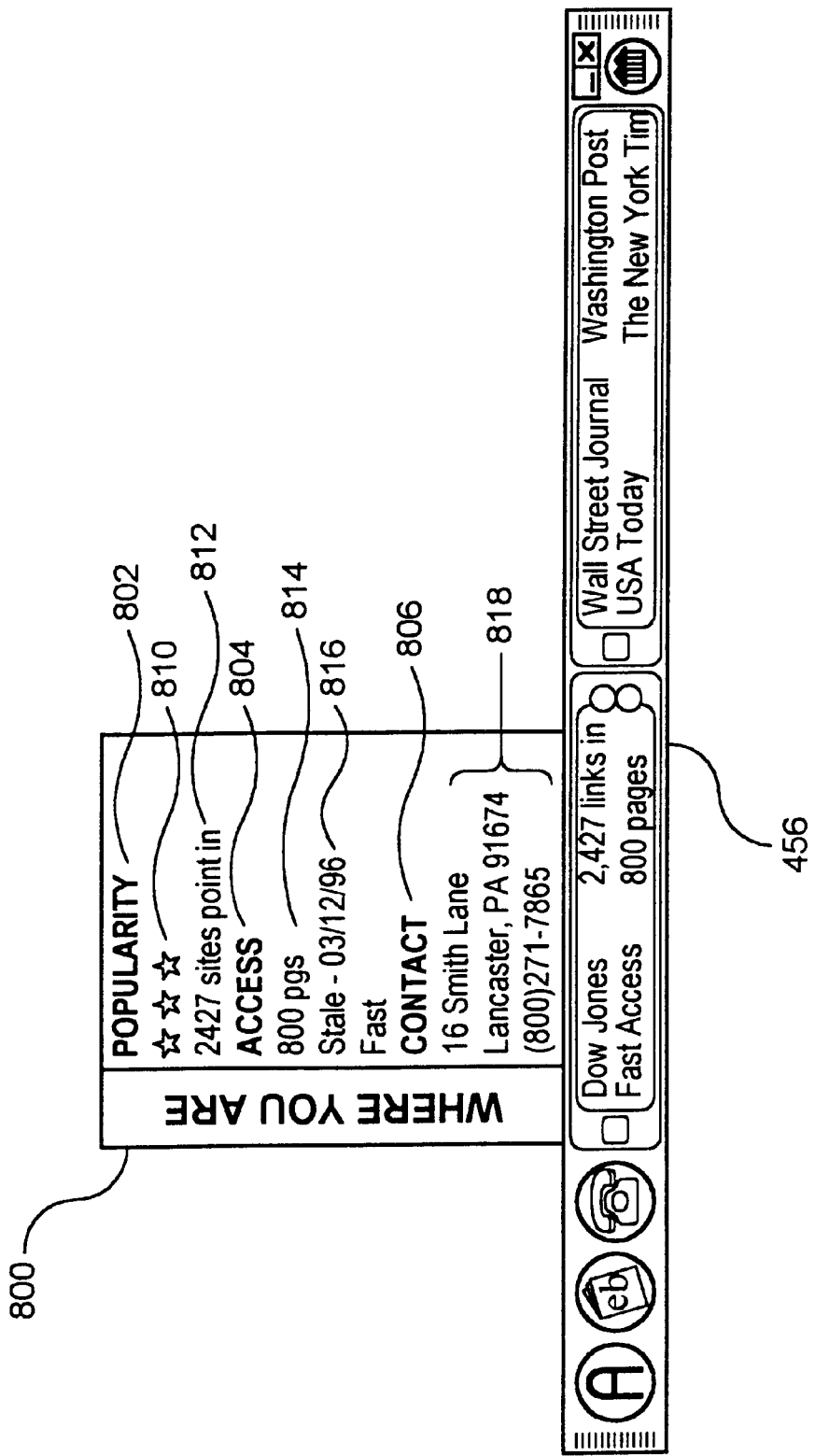
FIG. 8 shows an example of the "Where you are" popup menu.

FIG. 7 is a flow chart showing steps performed by client 140 when a user activates an "Where you are" popup menu from the button bar. FIG. 8 shows an example of an "Where you are" popup menu 800.

In step 702, client 140 determines that the user has activated the "Where you are" area. Such activation preferably is done by clicking on a button 460 or by moving the mouse over the area 456. Any appropriate method of activation can be used. In step 704, client 140 displays an "Where you are" popup menu, an example of which is shown in FIG. 8. Popup menu 800 is discussed in detail below.

Popup menu 800 allows the user to view various metadata about the web page being displayed by the browser. This data can include, without limitation: ratings, freshness, "sites pointing in," address, page history, stock symbols, number of pages in the site, access speed, link to an online mapping service, telephone number, a data group (based on, for example the Standard Industrial Classification (SIC) code), and financial review data. The metadata can also include specialized metadata. An example of specialized metadata is metadata about college web pages, such as enrollment or tuition. Although not shown, popup area 800 can also include ads or ad links. It should be understood that these metadata are provided for purposes of example only and are not intended to limit the scope of the invention. Other implementations of the present invention may include some subset of this metadata or may include additional types of metadata not discussed herein.

In the described embodiment, all metadata is gathered by database 108 (or a similar system) from the archived web pages and stored so that it can be sent in response to a request from client 140. Other implementations may obtain metadata using these or other appropriate methods.

For example, a rating is a compilation of user ratings for the displayed page. As shown in FIG. 4, area 456 includes a smiling face and a frowning face 480. If the user clicks on the smiling face, a positive vote is recorded for the site. If the user clicks on the frowning face, a negative vote is recorded for the site. The user ratings are sent to server 108 where ratings from many users are periodically used to determine a site rating. As a further example, freshness defines how recently the web pages has been updated. This information is available from either the HTTP header of the page or by noting differences between various versions of the page. In either case, freshness data is gathered by database server 108 (or some other off-line software) and stored so that it can be sent when requested by client 140.

In the popup menu of FIG. 8, the metadata is organized into categories. Other implementations of the present invention may simply display the metadata and not use categories. The categories include: "popularity" 802 (which includes a "star" rating and a number of sites pointing to the displayed page); "access" 804 (which includes a number of pages in the site to which the currently displayed page belong, a most recent date of update for the page, and whether the page is classified as "fast" or "slow" access); and "Contact" 806 (which includes a contact address for the owner of the currently displayed page). Other categories that can be included in popup menu 800 include (but are not restricted to): "Industry" (which includes the name of the type of business associated with a given SIC code) for the company owning the currently displayed web site, a stock symbol of the company, and other financial data about the company); "Education" (which includes in state and out of state tuition information, etc. on an educational institution that own the currently displayed web page). Popup menu 800 can also include "Maps" (which includes a visual representation of the path that the currently displayed page took from server 106 to user computer 102 and a map of the site to which the currently displayed page belongs) and "History" (which includes data about when the site first appeared, how it has grown, and so on). Certain implementations of the present invention can choose to display all available metadata or can tailor the metadata displayed, depending on user-specified preferences.

The metadata available to the user in popup menu 800 is gathered from a variety of sources by database server 108. Some sources for this data include: the archived web pages stored in database 110, the EDGAR database of the Securities and Exchange Commission, and publicly available databases about schools and companies.

Not all types of metadata are available for all web pages. Additionally, only a subset of the metadata available for a site may be displayed in area 456 of the button bar 405. To view other metadata, the user can activate the popup menu 800.

Returning to FIG. 7, if, in step 706, the user indicates one of the "hot" areas in popup menu 800, client 140, in step 708, communicates with browser 130, as shown in FIG. 6(*c*) so that browser 130 fetches and displays a web page having further details about the metadata. For example, if "popularity" is a hot area, a related web page returned from server 108 may contain an explanation of how the popularity data is collected. In step 710, if the user clicks outside the popup menu, the client closes the popup menu.

2. "Where to go next" Data

Figure 9:
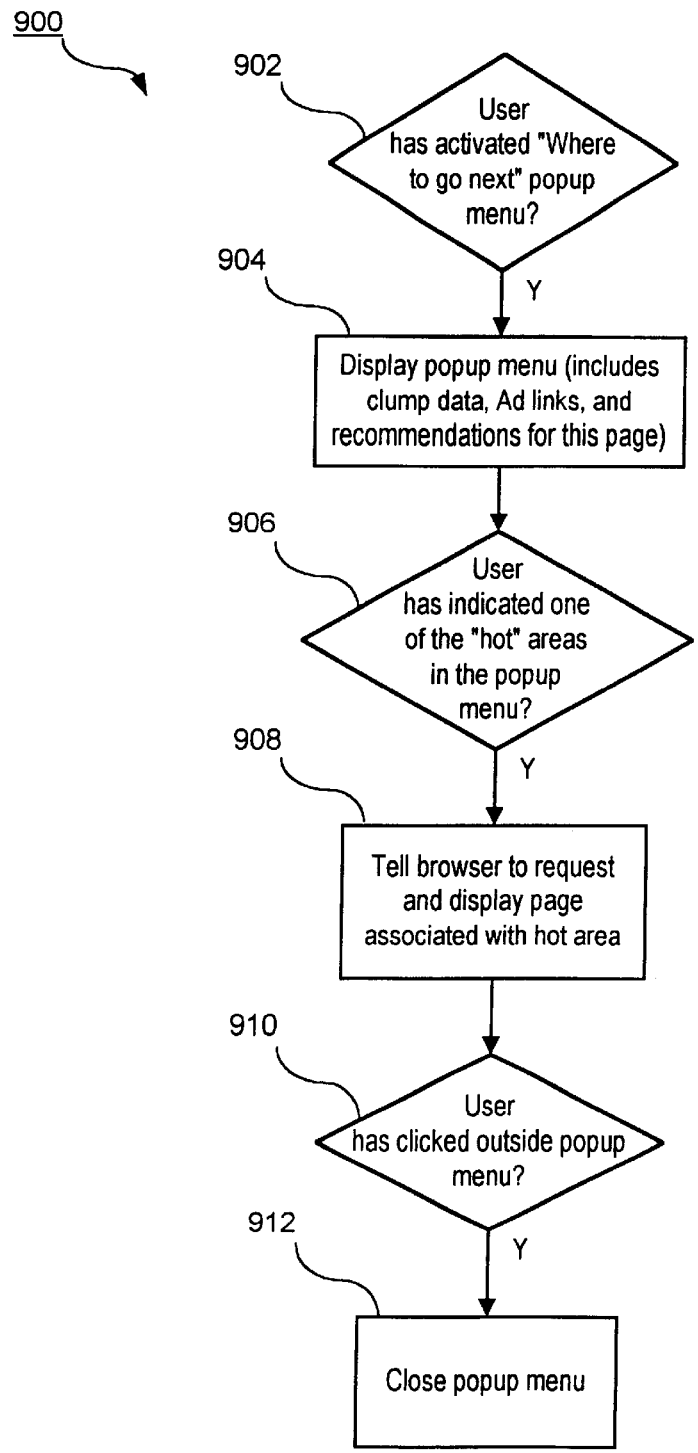
FIG. 9 is a flow chart showing steps performed by the client when a user activates a "Where to go next" popup menu from the button bar.
Figure 10:
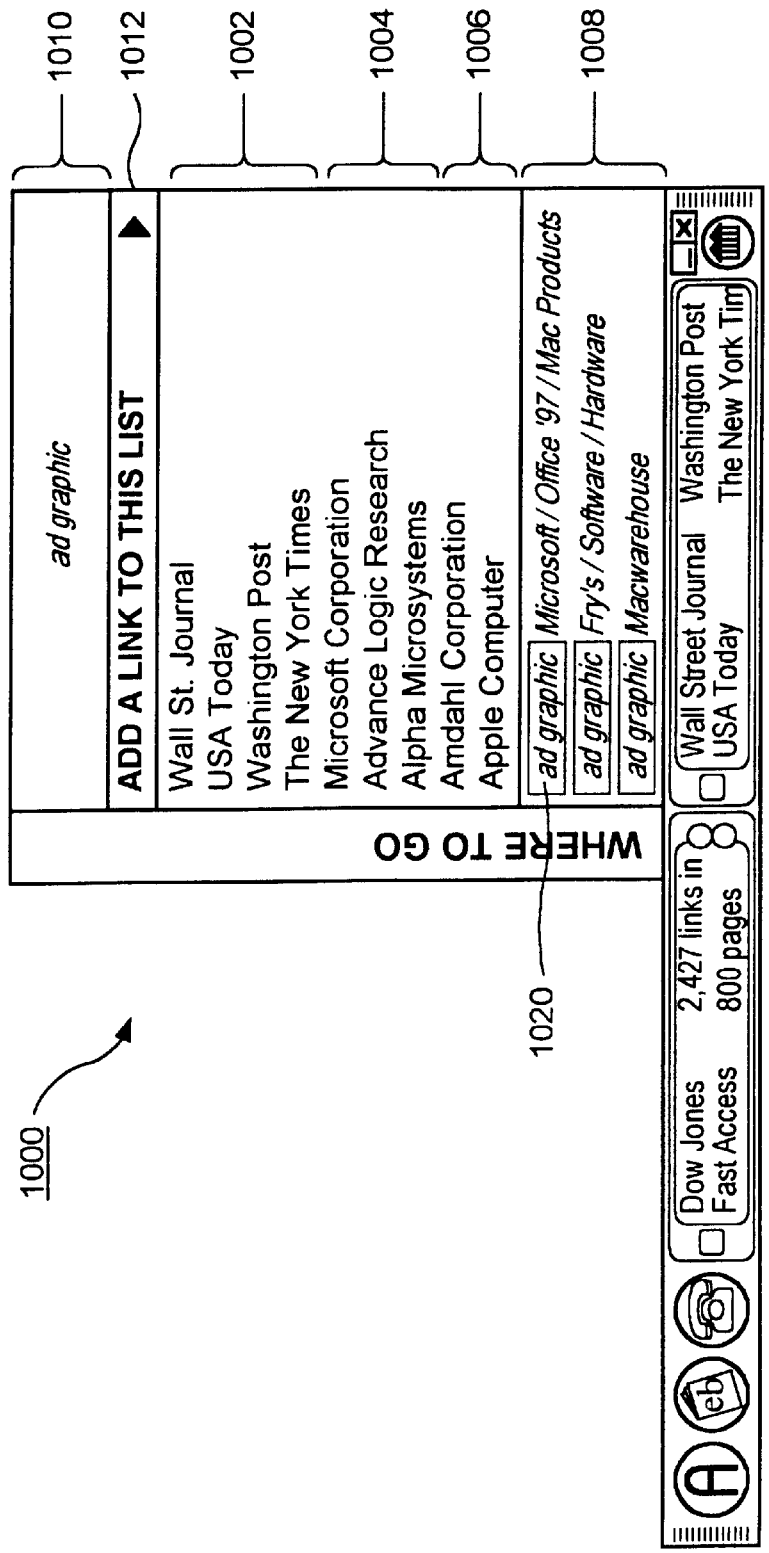
FIG. 10 shows an example of the "Where to go next" popup menu.

FIG. 9 is a flow chart showing steps performed by the client when a user activates a "Where to go next" popup menu from the button bar. FIG. 10 shows an example of the "Where to go next" popup menu 1000.

In step 902, client 140 determines that the user has activated the "Where to go next area". Such activation preferably is done by clicking on a button 460 or by moving the mouse over the area 456. Any appropriate method of activation can be used. In step 904, the client displays a "Where to go next" popup menu, an example of which is shown in FIG. 9. Popup menu 1000 is discussed in detail below.

Popup menu 1000 allows the user to view various metadata about the web page being displayed by the browser. This data can include links suggested by the system, links previously saved by the user, links suggested by other users, and advertisements (links to pages whose owners have paid a fee for their inclusion in the metadata). Other implementations of the present invention may include some subset of this link metadata or may include additional types of link metadata not discussed herein.

In the described embodiment, all metadata is gathered by server 108 (or a similar system) from the archived web pages and stored so that it can be sent in response to a request from client 140. FIG. 10 shows four types of links: links suggested by the system 1002, links suggested by users 1004, links suggested by the specific user 1006, and paid links 1008. Links suggested by the system preferably are periodically determined by analysis of the archived web data and usage trails of users to determine what other pages users most often visit before or after the displayed page. Links suggested by users are uploaded from client 140 to database server 108 on a periodic basis and used to update the user-suggested links. Links suggested by each user are also uploaded to server 108. Paid links (advertisements) are provided by the owners of the links. The owners pay to have their links included in one or more "clumps" of links. For purposes of illustration, the number of clumps in the discussion below is set to be 2 raised to the 16th power, or 65,536. It is understood that other implementations could choose a different number of clumps. The advertisers determine which clumps are most likely to attract their desired audience. Clumps are discussed in more detail below.

The described embodiment of the present invention displays a predetermined maximum number of links in a popup menu. The client preferably uses a predetermined method for determining which types of metadata links should be displayed. The client always displays links entered by the user into the client. (These user-specific links can be saved locally or in server 108). Links suggested by the system and by other users have a value associated therewith representing a degree of correlation with the displayed web page. Client 140 makes sure to include in the popup menu those links having a highest degree of correlation, and includes other links if there is room in the popup menu. The described embodiment does not display the types of non-paid links differently. Other implementations may indicate which link is of which non-paid link type by a suitable graphical indication, such as color or highlighting. Ad graphic 1010 can be either a simple graphic or a link.

Returning to FIG. 9, if in step 906, the user selects one of the "hot" areas in popup menu 1000 (i.e., any of the links), client 140, in step 908, communicates with browser 130, as shown in FIG. 6(c) so that browser 130 fetches and displays the web page corresponding to the link. In step 910, if the user clicks outside the popup menu, the client closes the popup menu.

Figure 11:
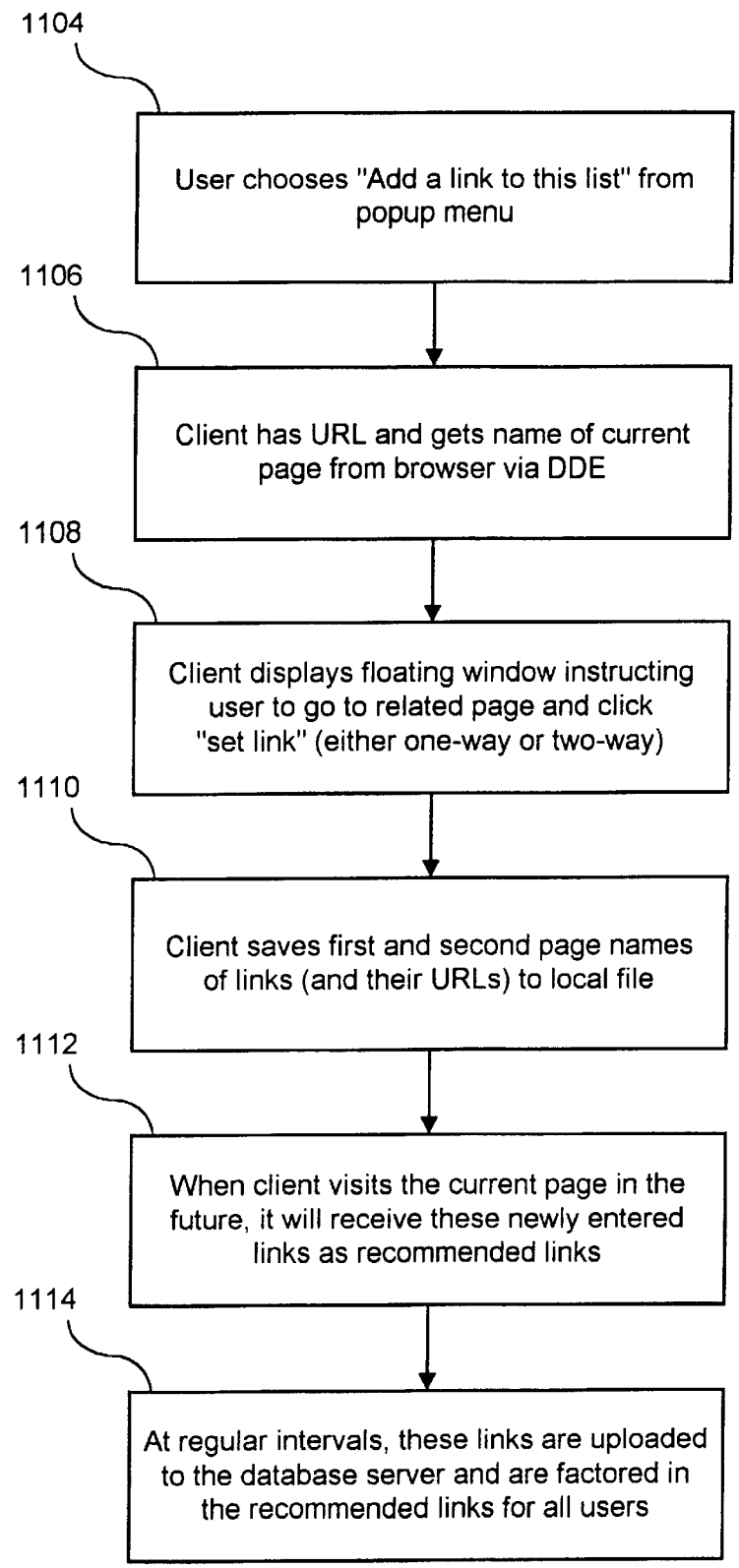
FIG. 11 is a flow chart showing steps performed by the client when the user has clicked on a "Add link" area of the "Where to go next" popup menu.

FIG. 11 is a flow chart showing steps performed by the client when the user has clicked on a "Add link" area of popup menu 1000. In step 1104, client 140 detects that the user has clicked on "Add a link to this list" area 1012.

Figure 12A:
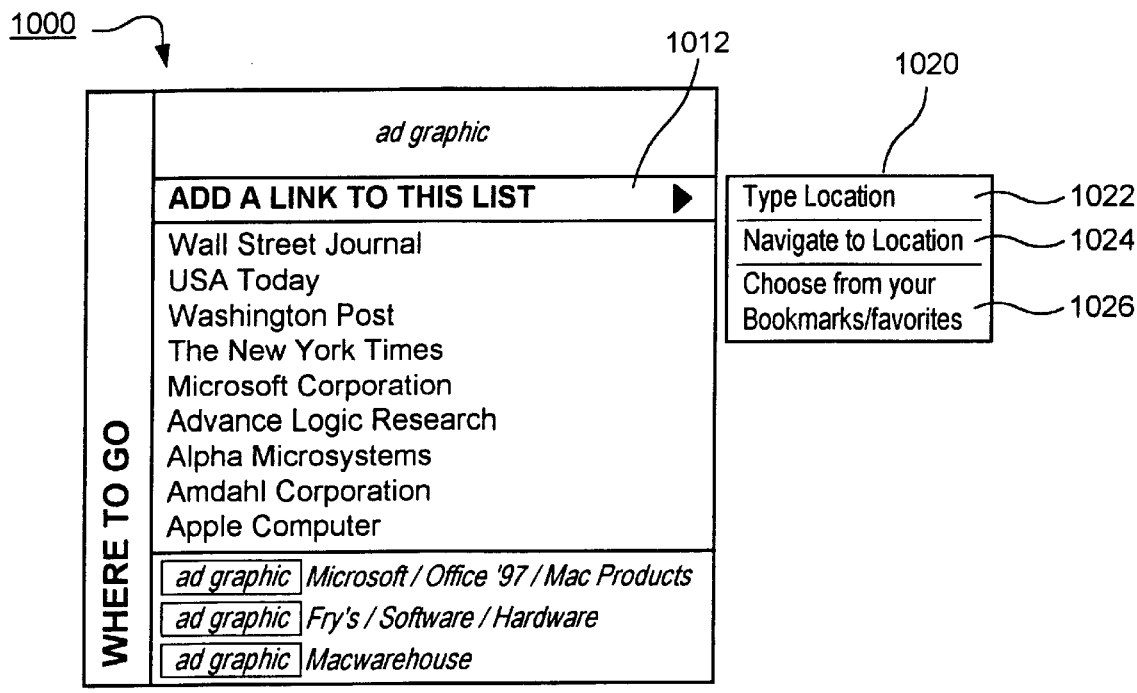
FIGS. 12(a) through 12(d) show examples of a popup menu and dialog boxes for an "Add link" function of FIG. 10.

FIGS. 12(a) through 12(d) show examples of a popup menu and dialog boxes for an "Add a link" function of FIG. 10. FIG. 12(a) shows a popup 1020 that allows the user to select between three options: "Type location" 1022, "Navigate to location" 1024, and "Choose from your bookmarks/favorites" 1026.

Figure 12B:
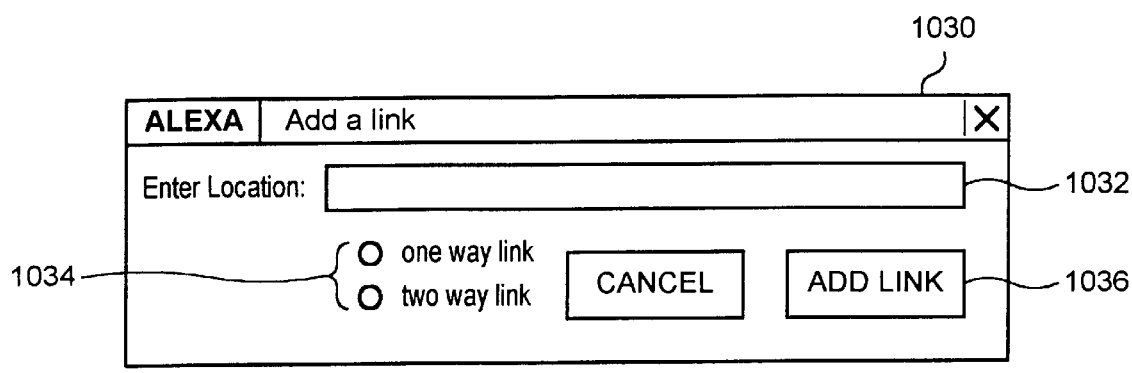

As shown in FIG. 12(b), if the user chooses "Type location," client 140 displays a dialog box 1030 that asks the user for the URL of the link to be added. The user types the URL in area 1032 and checks whether the link is one-way or two-way in area 1034. Both one way and two way links mean that the current page will have a link to the specified page. A two way link means that additionally the specified page will have a link to the current page. When the user clicks on "Add link" button 1036, client 140 sends the entered URL to the browser via the DDE interface. The browser fetches the page from server 106 and returns the name of the page to the client. The name of the page is displayed as a label 1006. The client saves the URL of the current page, the entered URL, and the name of the page, to be downloaded to server 108 at a predetermined later time. In the case of two-way links, the name of the URL of the current page is captured via DDE and stores as well. The server 108 will add the new links to its saved metadata for the current page (and for the entered page).

Figure 12C:
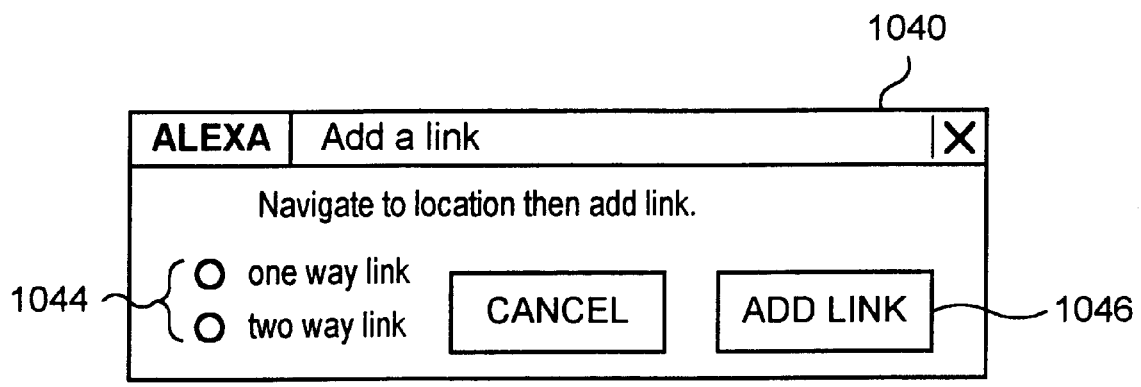
Figure 12D:
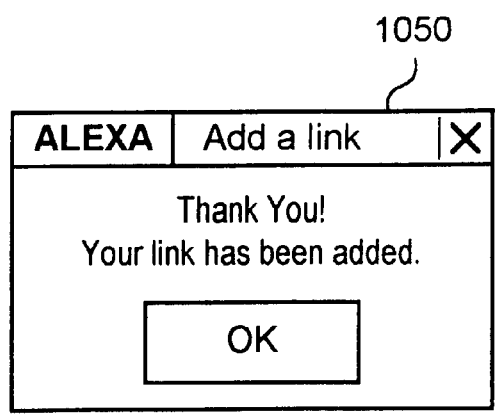

As shown in FIG. 12(c), if the user chooses "Navigate to location" or "Choose from favorites/bookmarks," client 140 displays a dialog box 1040 that asks the user to navigate to the location. Using the browser, the user navigates to the new page. As described above, whenever the user moves to a new page via the browser, the browser communicates with the client to tell the client the URL of the new page. Thus, client 140 can determine to which page the user has navigated. The user checks whether the link is one way or two way in area 1044. When the user clicks on the "Add link" button 1046, client saves the URL of the current page, the URL of the page navigated to, and the name of the page, to be downloaded to server 108 at a predetermined later time. In the case of two-way links, the name of the URL of the current page is captured via DDE and stored as well. The server 108 will add the new links to its saved metadata for the current page (and for the entered page if the user indicates a two-way link).

After both dialog boxes 1030 and 1040, client 140 display dialog boxes 1050 to indicate that the link has been added. In the described embodiment, client 140 also displays the new link in popup menu 900 and adds the link to the data structure of FIG. 5(b) so that it is displayed in the popup menu 1000.

3. Reliable Access to Archive Copy

Figure 13:
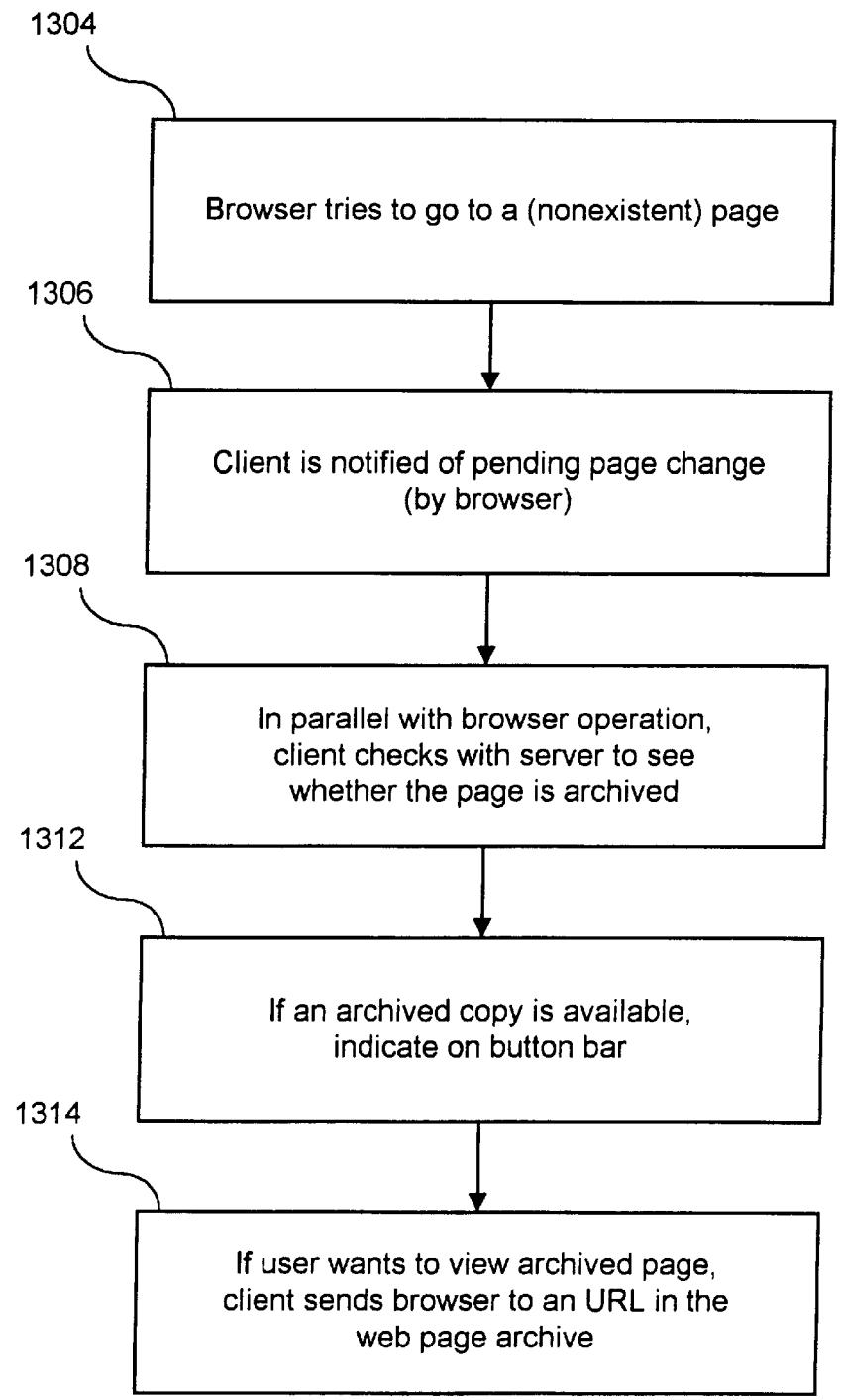
FIG. 13 is a flow chart showing steps performed by the client when the user has attempted to go to a nonexistent page.

FIG. 13 is a flow chart showing steps performed by the client when the user has attempted to go to a non-existent page. This may occur, for example, when the user attempts to go to a page that previously existed, but has been removed. As discussed above, server 108 preferably periodically stores a "snapshot" of all or a subset of public web pages in database 111. (It should be understood that the scope of the present invention is not limited to storing only public web sites, but also includes systems where this service maintains information about an archive of private sites not available to the general public. For example, the present invention may be implemented to archive the pages on a company's private intranet).

In a preferred embodiment, whenever browser 130 tries to go to a page, it communicates the URL of the page to client 140. As shown in step 1306, each time client 140 receives a new URL, it check with server 108 to see whether there is a copy of the page having that URL in the web archive. It then displays this availability to the user in step 1312 by animating an icon (such as icon 459) or by displaying a message.

If the user indicates that he would rather view the archived page, the client sends the browser to the archived page via the DDE interface in step 1314. In a preferred embodiment of the present invention, an archived page is stored as a web page in server 108 having a name corresponding to its original name. Thus, client 140 knows the URL of the archived page because it knows the original URL.

For example, if the browser tries to go to:
www.nolongeravailable.com/index. HTML
the user can choose to have client 140 send the browser to:
http://www.alexa.com/archive/
www.nolongeravailable.com/index.HTML
which is a web page in the archive of web pages.

In a preferred embodiment, archive icon 492 is animated when a web page is not found and the user chooses to view the archived page. Such animation serves as a visual reminder to the user that he is viewing an archived page. Client 140 preferably also displays a message reminding the user that he is viewing an archived page in area 458 (or some other appropriate area).

In the described embodiment, the user can also set preferences indicating that he always wants client 140 to use an archived page if a nonexistent page is found (without asking the user first).

4. Slow Links

From time to time, a user may experience that the retrieval of pages from a particular web site is unusually slow. This slowness may arise because the server 106 on which the page resides is slow, or because the path between the server and the user is overburdened. In such cases, it may be that the path to the central server 108 is faster. If a copy of the desired page is held in the service web archive, the copy can be made available to the user.

As discussed above in connection with FIG. 13, if an archived copy is available, the client 140 indicates availability of the archived page to the user. If the user chooses to view the archived page, the client sends the browser to the archived page via the DDE. In a preferred embodiment of the present invention, an archived page is stored as a web page in server 108 having a name corresponding to its original name. Thus, client 140 knows the URL of the archived page because it knows the original URL.

For example, if the following page is a slow page:
www.slowpage.com/HTML the user can choose to have client 140 send the browser to:
http://www.alexa.com/archive/www.slowpage.com/HTML which is a web page in the system archive of web pages.

In a preferred embodiment, archive icon 459 of FIG. 4 is animated when an archived web page is available. Such animation serves as a visual reminder to the user that he can choose to view an archived page. Client 140 preferably also displays a message reminding the user that he is viewing an archived page in area 458 (or some other appropriate area).

In the described embodiment, the user can also set preferences indicating that he always wants client 140 to use an archived link instead of a slow link.

III. Communication Between the Client and the Database Server

The following paragraphs describe how metadata is transferred between database server 108 and client 140. This description should be taken by way of example and is not intended to limit the scope of the present invention.

1. Overview

As discussed above, any appropriate database could be used in conjunction with the present invention and the present invention can display any appropriate types and combinations of metadata and other information. It is not necessary for database 110 to include an archive of every public web page, as is attempted by the described embodiment. All that is needed is that database 110 contain enough metadata to be useful for the user group for which it is implemented.

In addition, database 110 preferably includes a usage trails database. The usage trails database provides the storage and organization for all usage patterns. The usage data will provide background information for determining such things as the popularity of web sites, the most popular link from a given page, implicit models of individual user preferences, and extensive statistics about the advertising impressions viewed by users. For example, the server may keep statistics on how many users who are looking at an automotive site have seen a particular automotive ad or ad link (via the button bar). To preserve individual privacy, the described embodiment does not connect usage trails with a user's name, but with a numeric identifier. Privacy measures are implemented in compliance with standards from such organizations as E-Trust and the Electronic Frontier Foundation.

Usage summaries include, for example, some or all of: data relating to the number of minutes users are online, the number of "page changes" performed by users during a session, the number of recommended links followed by users, and user voting results.

Other metadata is "mined" from the archived pages themselves. For example, recommended links are preferably determined from an analysis of user usage trails. Some recommended links for a given page are the links that users most frequently go to from that page.

Figure 14:
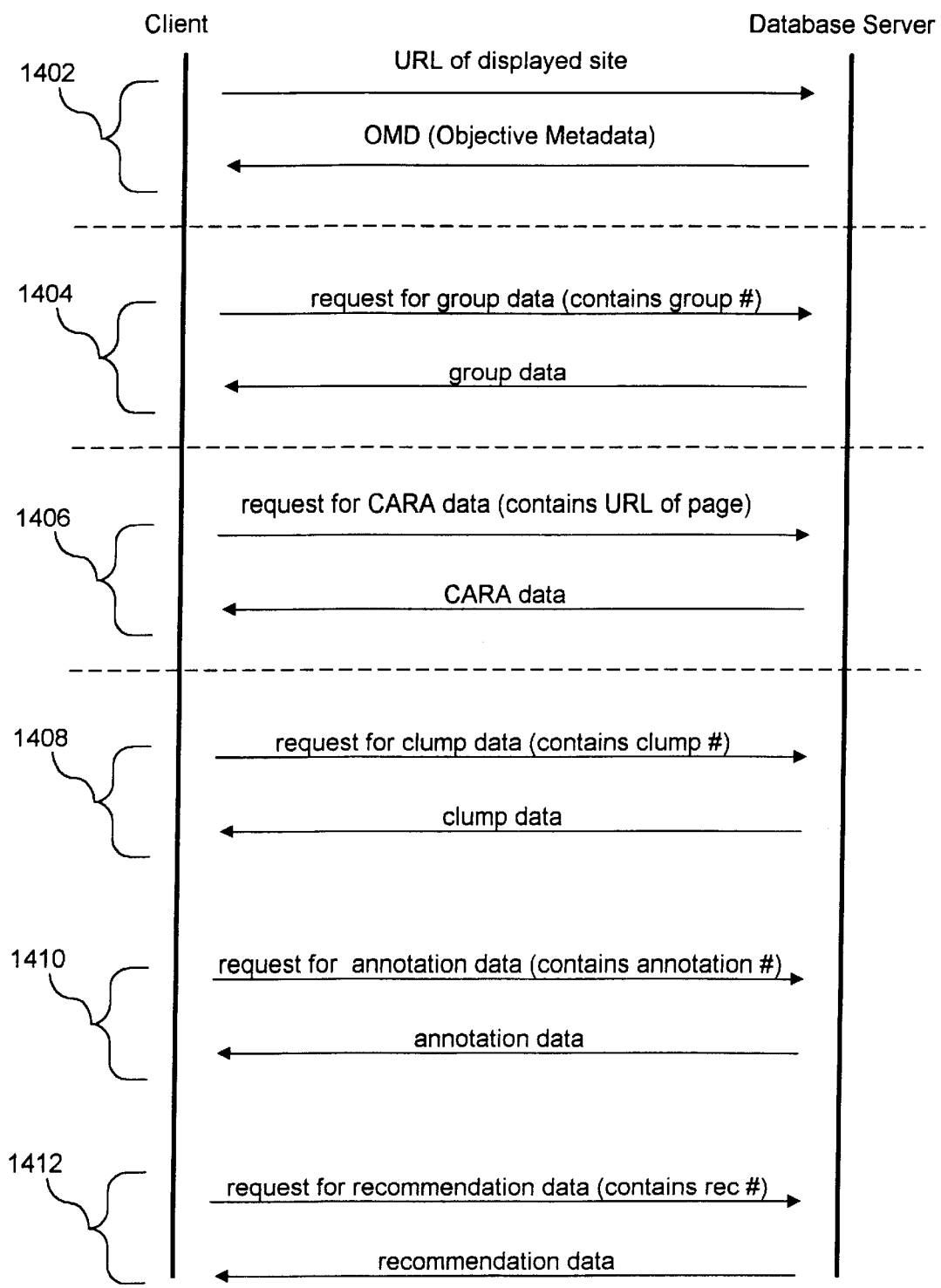
FIG. 14 is a diagram of metadata being transferred between the client and a database server of FIG. 1.

FIG. 14 is a diagram of one way that metadata can be transferred between client 140 and database server 108 of FIG. 1. In step 1402, the client sends an URL of the site of the displayed web page (which it received from the browser) to database server 108. The database server returns Objective Metadata (OMD), which is metadata for the site containing the current page, in accordance with the URL of the site. If the OMD for the site has previously been fetched and cached by the client, step 1402 is omitted.

One element of site OMD is the name of the owner/registrant of a web site. By correlating this name with other public or private databases, it can be established whether the registrant organization is a member of some class of organizations. For example, U.S. corporations with publicly traded securities register with the Securities and Exchange Commission. As part of this registration, the organization must identify which of the Standard Industrial Classification (SIC) best describes their primary business. For example, the organization might identify itself as an automotive manufacturer. The described embodiment of the present invention can then offer for example, when the user is looking at this organization's site, links to web sites of organizations with similar primary businesses (i.e., competitors). The usage of membership in a class is not limited to SICs. For example, a directory of colleges might indicate whether the given college is two-year, four-year, public/private, and so on. Again, this information can be displayed along with links to sites related by way of their membership in a class.

As discussed below, the OMD can contain a group number for the site. The group number identifies a group of sites that have been determined to have some feature in common and/or some particular information that has been deemed to have some feature in common. If a site has a particular group number, it has been previously determined that the site belongs to a group of sties for which the site information is relevant. All sites in the same group receive the same group data.

In step 1404, the client sends the group number received in step 1402 to database server 108. The database server returns group data, which is metadata for a particular grouping to which the current site belongs. If the group data for the group number has previously been fetched and cached by the client, step 1404 is omitted. In other implementations, the OMD and group data are kept for each page, instead of for each site.

While it is possible to record in the central database information relevant to every instance of every page on the web, the described embodiment of the present invention uses a more efficient way of encoding and transmitting this information. This mechanism has several virtues, including compactness, its ability to take advantage of caching on the client or server (to reduce bandwidth requirements and improve performance), and its ability to allow one URL to inherit data from another URL above it in the web site directory structure. Central to the described embodiment of the present invention is the observation that the unique string used to identify a web page for retrieval (the URL) happens to include the server name, directory structure path, and file name. The individual assembling the web site uses directory structure to organize files into a logical structure for ease of management. For example, instead of placing all web pages at the top-level directory of the web server, an office product manufacturer might organize files into directories with names like "products"(containing product information brochures), "sales" (containing a guide to sales offices), "support" (containing web pages about obtaining service), and so on. The "products" directory might in turn contain sub-directories for each of the various product lines, such as "copiers", "printers", "fax", and so on. So this web site might contain URLs of the form:

www.officemanufacturer1.com/products/copiers/copier1.html www.officemanufacturer1.com/products/copiers/copier2.html www.officemanufacturer1.com/products/copiers/copier3.html while a competitor might have a web site with URLs of the form:

www.copiermaker14.com/products/copier7.html www.copiermaker14.com/products/copier8.html www.copiermaker14.com/products/copier9.html In this case, it is desirable to be able to establish a link between all the copier descriptions on the two sites, so that a user can compare alternatives from competitors. The preferred embodiment of the present invention takes advantage of the fact that the URL contains implicit semantic information and allows pages to inherit recommendations set on a point further up the directory structure.

This mechanism may encode information about the group number for a cluster or clump of web pages, of which the given page is a member, the presence of text or other annotations for the given page, the presence of URL-to-URL recommended links, and the presence of the given page in the central archive. This system for encoding and inheriting information about Clumps, Annotations, Recommendations, and Archive status is referred to by its acronym "CARA."

In step 1406, the client sends a request for CARA data for the currently displayed page to database server 108. This request is the URL of the current page. The database server returns CARA (clump, annotation, recommendation, archived) data for the page in accordance with the URL. If the CARA data for the page has previously been fetched and cached by the client, step 1406 is omitted. The CARA data includes a clump number, annotation number, recommendation number, and archive-status information.

In step 1408, the client sends a request for clump data for the currently displayed page to database server 108. This request includes the clump number of the current page. The database server returns clump data for the page in accordance with the clump number. If the clump data for the page has previously been fetched and cached by the client, step 1408 is omitted.

The service offers the ability for users to annotate public web pages without altering the actual pages. In step 1410, the client sends a request for annotation data for the currently displayed page to database server 108. This request includes the annotation number of the current page. The database server returns annotation data for the page in accordance with the annotation number. If the annotation data for the page has previously been fetched and cached by the client, step 1410 is omitted. Instead, the annotations are kept on the central server 106 and merged with the public pages by the server or client. The annotations are indicated by hot areas on the page, which popup to display annotations when the user clicks on one of the hot areas.

In step 1412, the client sends a request for recommendation data for the currently displayed page to database server 108. This request includes the recommendation number of the current page. The database server returns recommendation data for the page in accordance with the recommendation number. If the recommendation data for the page has previously been fetched and cached by the client, step 1412 is omitted.

It should be understood that metadata can be transferred between server 108 and client 140 in any appropriate protocol or format. For example, in an alternate implementation, all metadata (e.g., OMD and CARA data) is transmitted from server 108 to client 140 in a single transmission.

Figure 15:
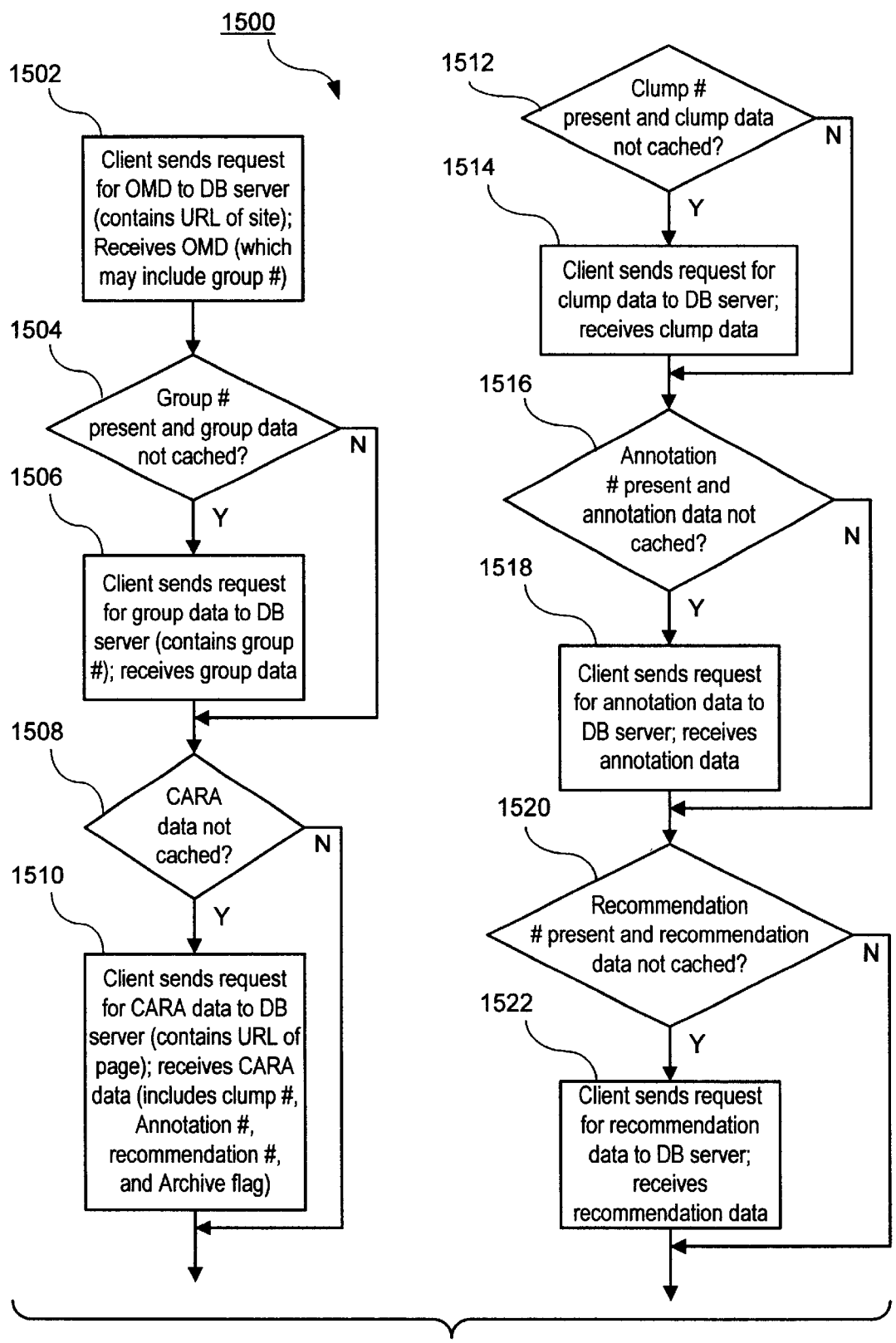
FIG. 15 is a flow chart showing steps of a method performed by the client to request metadata from the database server.

FIG. 15 is a flow chart showing steps of a method performed by the client to request metadata from the database server. In certain implementations, the archive flag is not included in the CARA data. Instead, as shown in FIG. 13, the client sends a separate request to server 108 for each user-requested URL to determine whether the requested page is archived.

2. Example Formats of Metadata

FIGS. 16(*a*) through 16(*g*) show example formats of metadata stored in server 108. FIG. 16(*a*) shows an example format of OMD, a type of metadata that is site specific. The OMD includes a group number for the site, as described below in connection with FIG. 16(*b*). The OMD also includes information such as the number of links in to the site, and the number of pages in the site. It should be understood that the OMD can contain any appropriate data and have any appropriate format as long as the database server and the client are in agreement on the contents and format.

FIG. 16(*b*) shows an example format of group data, which is site specific. Each site may be assigned to a corresponding group, which has a group number. The group contains any type of information relating to the sites in the group. For example, the group data may include the URLs of each site in the group (so that they can be displayed as links by the client). As a further example, in the case where the group number maps to a particular SIC code, the group data might include the label for that SIC code. As a further example, if the group is arranged so that all sites in the group have the same SIC, the group data may contain a definition of what it means to be in that SIC. The group information may include such information as Dow Jones information, stock symbols, financial information, etc. The server 108, for example, has previously performed data mining the web to include this information, accessing such web sites as the SEC's EDGAR database. It should be understood that the group data can contain any appropriate data and have any appropriate format as long as the database server and the client are in agreement on the contents and format.

FIG. 16(*c*) shows an example format of CARA data, which is page specific. Each page is assigned a specific CARA value, where the first three components of the CARA data represents a metadata group to which the page is assigned. The CARA data contains a clump number, which preferably has 2 hexadecimal digits; an annotation number, which preferably has 4 hexadecimal digits; a recommendation number, which preferably has 4 hexadecimal digits; and an archive flag, which preferably has one hexadecimal digit.

FIG. 16(*d*) shows an example format of one clump of data, which is page specific, in that, each page is preassigned to one of a plurality of clumps. Each clump identifies one or more links that the browser can choose to display as recommended links for the page. Thus, clump data preferably includes at least one URL and a corresponding tag (such as "The Wall Street Journal", as shown in FIG. 4). Clump data for paid links also include a graphic number for a small graphic (such as graphic 1020 of FIG. 10) that is displayed with the paid link in popup menu 1000. In a preferred embodiment of the present invention, client 140 requests this graphic from server 108 in accordance with the graphic number. In another preferred embodiment, client 140 stores these graphics in memory 204, where they are periodically updated. Any appropriate method of obtaining the small graphic for a paid link may be used without departing from the spirit of the present invention.

FIG. 16(e) shows an example format of one group of recommendation data, which is page specific, in that, each page is preassigned to one of a plurality of groups. Each group identifies one or more links that the browser can choose to display as recommended links for the page. Thus, recommendation data preferably includes at least one URL and a tag (such as "Microsoft Office", as shown in FIG. 4).

FIG. 16(f) shows an example format of archive flags, which are page specific. The archive flags include flags indicating whether the page is archived 1682, whether the clump data inherited its recommended links from pages above it in the site hierarchy, and whether the recommendation data inherited its recommended links from pages above it in the site hierarchy (as discussed below in connection with FIG. 18). The inheritance information is used by client 140 to determine how important the various potential links are. In the described embodiment, inherited links are deemed to be less important than links associated directly with a page. Various implementations of the present invention may include some subset of these flags or other appropriate archive flags.

3. Actions by the Database Server

The following paragraphs discuss how server 108 responds to requests from client 140 in a preferred embodiment of the present invention. In the described embodiment, the server is designed to receive up to 100 hits per second. Thus, it is important that server 108 be able to respond to each request very rapidly. In the described embodiment, this goal is achieved by organizing the metadata in clumps, groups, etc. and having fast access methods for accessing the metadata.

Figure 17:
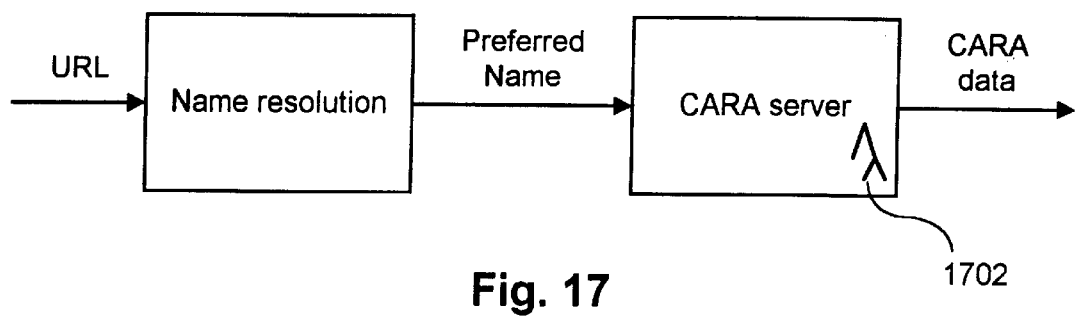
FIG. 17 is a block diagram showing how the database server translates an URL of a page to a particular type of metadata.
Figure 18:
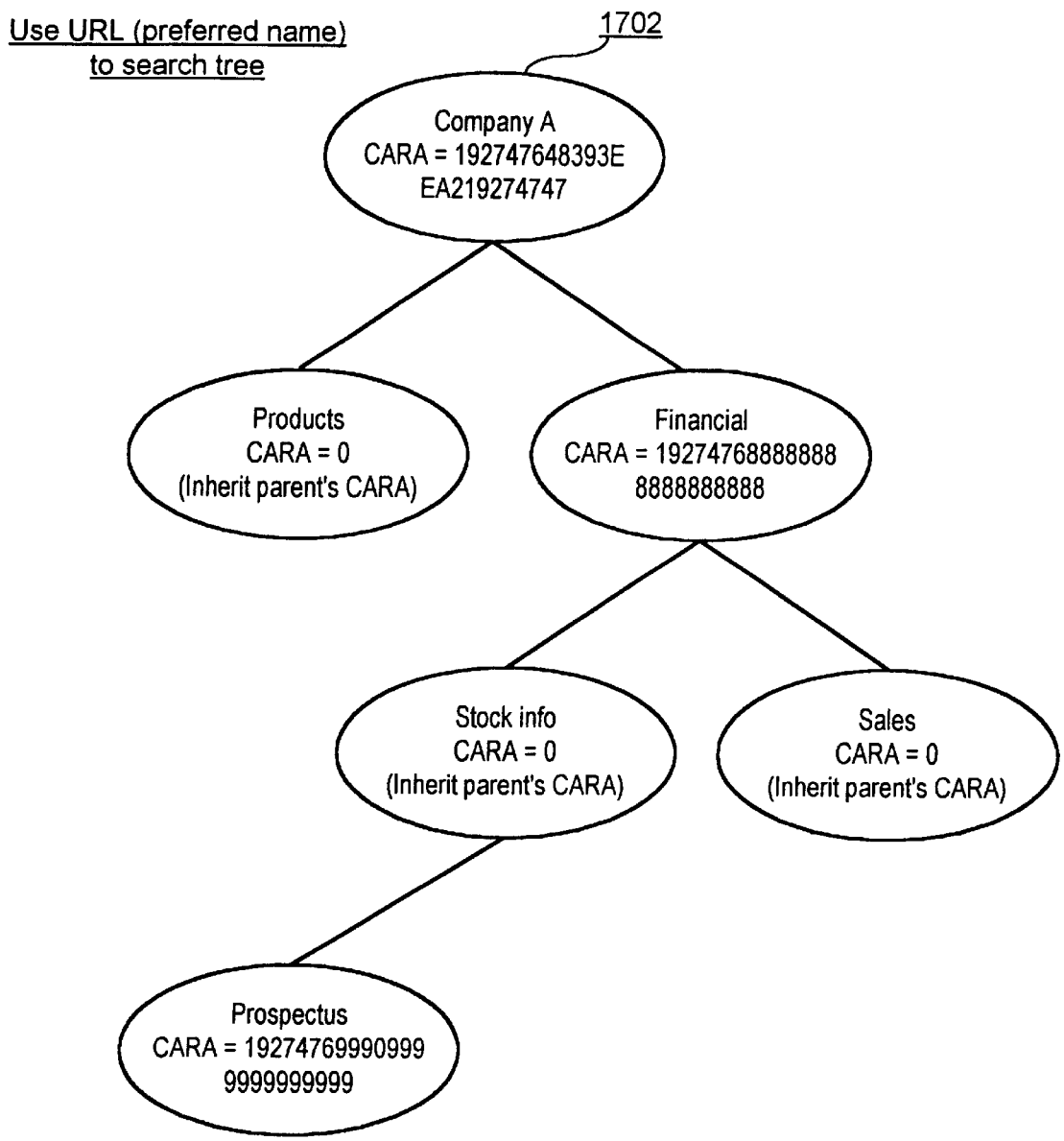
FIG. 18 shows further details of the translation process of FIG. 17.
Figure 19:
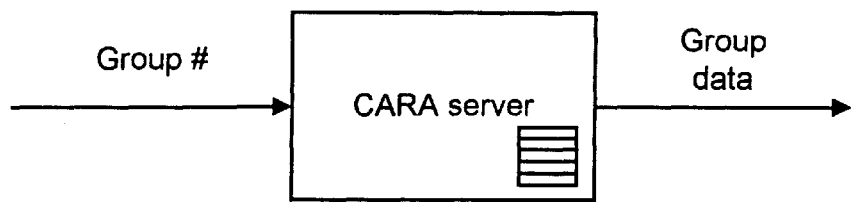
FIG. 19 is a block diagram showing how the database server translates a number associated with a particular type of organization to a particular type of metadata.
Figure 20:
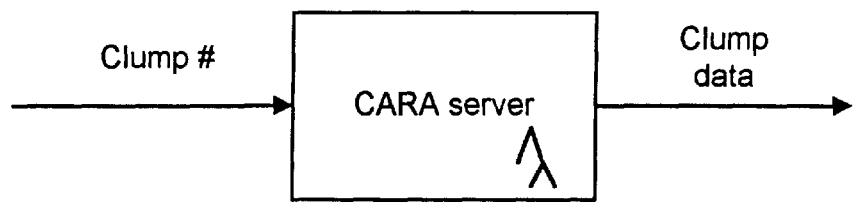
FIG. 20 is a block diagram showing how the database server translates a clump number to a particular type of metadata.
Figure 21:
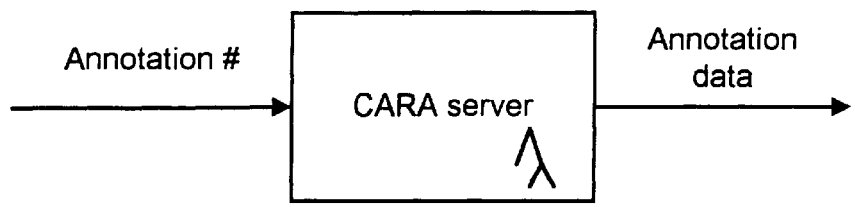
FIG. 21 is a block diagram showing how the database server translates an annotation number to a particular type of metadata.
Figure 22:
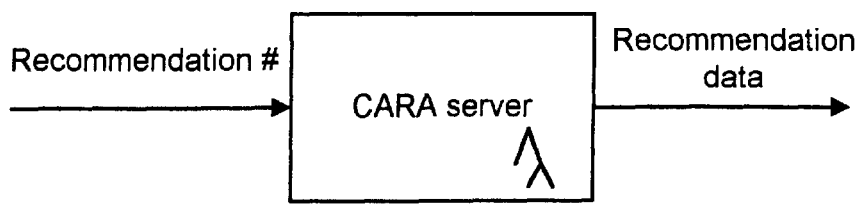
FIG. 22 is a block diagram showing how the database server translates a recommendation number to a particular type of metadata.

FIG. 17 is a block diagram showing how the database server translates an URL to CARA data. Server 108 receives an URL for the currently displayed page and normalizes it in accordance with a predetermined lookup table. Thus, if a single site is often referenced by an alias, the name resolution step normalizes URLs containing the alias to URLs containing the true site name. The normalization step, which is not essential to the present invention, allows the server 108 to have a single lookup tree for each site/page. After the URL is normalized, server 108 performs a lookup in the tree data structure of FIG. 18 in accordance with the URL. As shown in FIG. 18, for example, the following URLs translate to the following CARA data.

URL=CompanyA/Products→CARA= 92747648393EEA2927476483

URL=CompanyA/Financial/Stock info→CARA= 192747688888888888888888

URL=CompanyA/Financia/Stock info/ prospectus→CARA=19274769990999999999999

Note that the URL for CompanyA/Products is actually assigned the CARA data of its parent (CompanyA), since the products branch has no CARA value of its own. In the example, both CompanyA/Products and CompanyA/Financial/Stock info are said to "inherit" the CARA data of their parent. The data structure of FIG. 18 preferably is implemented as a tree data structure stored in a memory of server 108.

FIGS. 19–22 are block diagrams showing how database server 108 translates, respectively, a group number, a clump number, an annotation number, and a recommendation number to a particular type of metadata. In the described embodiment, the group number is translated via a straight lookup table, since there are a relatively small number of groups (approximately 2000). The clump number, annotation number, and recommendation number preferably are translated using a tree-like file structure conceptually similar to the tree-like data structure of FIG. 18. Thus, for example, a clump number of 9274 translates to information stored in a file named "clumpinfo\9\2\7\4" on server 108 (i.e., a file named "4" inside a directory structure clump\9\2\7.

FIG. 23 shows an example of CARA metadata. FIG. 24 shows an example of a method performed by the database server to translate a clump number of FIG. 23 to the URL of a data structure containing the data for the clump. It should be understood that the group data and CARA data can be stored in any appropriate data structure without departing from the scope of the present invention.

It should be understood that the client 140 can be implemented using a variety of programming techniques, including but not limited to: implementing the button bar as a frame and displaying the button bar in a separate window. As discussed above, some of the function of communicating with server 106 can be moved from client 140 to a proxy server if a thinner client is desirable.

In summary, the described embodiments of the present invention allow the user to view metadata for web pages displayed by a browser. The metadata is displayed concurrently with the page being displayed by the browser. A client program communicates with the browser to obtain the URL of pages that the user has requested (via the browser) and to order the browser to view pages that the user has requested (via the client). The metadata includes metadata about the displayed page and metadata about related pages that the user might wish to view. The related pages include one or more pages chosen by the user in previous sessions, pages chosen by other users in previous sessions, pages recommended by the system, and paid links. The user can also choose to view archived pages in place of nonexistent or slow pages.

Other embodiments will be apparent to those skilled in the art from consideration of the specification and practice of the invention disclosed herein. It is intended that the specification and examples be considered as exemplary only, with a true scope of the invention being indicated by the following claims and equivalents.

What is claimed is:

1. A method of presenting information that augments the information on a web page being displayed on a display device by a browser, comprising the steps, performed by a data processing system, of:

receiving information identifying the web page to be displayed;

sending, to a metadata server, a request for automatically generated metadata, the automatically generated metadata being supplemental information about the web page to be displayed, the automatically generated supplemental information not being provided by the web page and not being provided by a member of a group to which a viewer of the web page belongs, there being no link between the web page and the automatically generated supplemental information, the metadata server being different from the server providing the web page; and displaying, on the same display device as the web page and concurrently with the web page, the automatically generated metadata received from the metadata server in response to the request, the automatically generated metadata including at least one link to a web page provided by a third party.

2. The method of claim 1, wherein the step of sending a request occurs automatically when the web page is displayed by the browser.

3. The method of claim 1, wherein the web page is displayed in a first window by the browser, and wherein the displaying step includes the step of displaying at least some of the metadata, the metadata being supplemental information about the web page being displayed in the window provided by the browser.

4. The method of claim 1, wherein the displaying step includes the step of opening a popup menu containing at least one link to another web page, the link being provided by the metadata server, not by the web page.

5. The method of claim 1, wherein the displaying step includes the step of opening a popup menu containing supplemental information about a group to which the web page belongs, the supplemental information being provided by the metadata server, not by the web page.

6. The method of claim 1, wherein the displaying step includes the step of opening a popup menu listing a cluster of URLS to which the web page belongs, the listing being provided by the metadata server, not by the web page.

7. The method of claim 1, wherein the displaying step includes the step of displaying, to supplement the web page being displayed, an advertisement targeted at users who request a URL of the web page, the advertisement being provided by the metadata server, not by the web page.

8. The method of claim 1, wherein the displaying step includes the step of displaying, to supplement the web page being displayed, an advertisement targeted at users who request any URL in a group of URLs to which the URL of the web page belongs, the advertisement being provided by the metadata server, not by the web page.

9. The method of claim 1, wherein the displaying step includes the step of displaying, to supplement the web page being displayed, an advertisement targeted at users who request any URL that is in a predetermined group, the advertisement being provided by the metadata server, not by the web page.

10. The method of claim 1, wherein the steps of receiving, sending, and displaying are all performed via a single browser window, where the browser has been altered to allow it to simultaneously connect to both the web site selected by the user and the metadata server, the metadata server being distinct from the web site.

11. The method of claim 1, wherein the receiving is performed by the browser and wherein the sending step and the displaying step are performed by client software, separate from the browser, but communicating with the browser.

12. The method of claim 1, wherein the receiving step is performed by browser and wherein the sending step and the displaying step are performed by plug-ins to the browser.

13. The method of claim 1, wherein the receiving step is performed by the browser, wherein the sending step is performed by a proxy server, and wherein the displaying step is performed by client software, separate from the browser, and communicating with the proxy server.

14. The method of claim 1, wherein the receiving step is performed by a first instance window of the browser connected with the web site, wherein the sending step is performed by a second instance window of the browser, and wherein the displaying step is performed by the second instance window of the browser communicating with the metadata server, the metadata server being distinct from the web site.

15. The method of claim 1, wherein the displaying step includes the step of displaying, to supplement the web page being displayed, "Where you are" metadata, the "Where you are" metadata not being provided by the web page.

16. The method of claim 1, wherein the displaying step includes the step of displaying, to supplement the web page being displayed, "Where to go next" metadata, the "Where to go next" metadata being based on usage trails in the world wide web, and not being provided by the web page.

17. The method of claim 1, wherein the displaying step includes the step of displaying metadata about the web page being displayed obtained from a third party in addition to metadata about the web page being displayed obtained from the metadata server.

18. The method of claim 1, wherein the requesting step includes the steps of:

receiving a URL of a web page of metadata for the displayed page, the web page of metadata being distinct from the web page being displayed;

requesting the web page of metadata for the displayed page, receiving a web page of metadata for the displayed page, and wherein the displaying step includes the step of displaying the web page of metadata via the browser.

19. The method of claim 1, wherein the metadata is based on data mining operations performed prior to the requesting step, the metadata being provided by the metadata server, not by the web page.

20. The method of claim 1, wherein the metadata identifies at least one web page that points to the displayed web page, the metadata not being provided by the displayed web page, and not being provided by the pointing web page.

21. The method of claim 1, wherein the metadata includes a number of web pages that point to the displayed web page, the metadata not being provided by the displayed web page, and not being provided by the pointing web pages.

22. The method of claim 1, wherein the metadata identifies at least one web page to which the displayed web page points, the metadata not being provided by the displayed web page, and not being provided by the web page to which the displayed web page points.

23. The method of claim 1, wherein the metadata includes a number of web pages to which the displayed web page points, the metadata not being provided by the displayed web page, and not being provided by the web page to which the displayed web page points.

24. The method of claim 1, further including the step of requesting information as to whether the web page has been previously archived; and if the web page has been previously archived, indicating that fact on the display screen.

25. The method of claim 24, further including the step of allowing the user to decide whether to view an archived version of the web page.

26. The method of claim 1, wherein the displaying step includes the step of displaying "Where to go next" metadata, in accordance with the received information, wherein the "Where to go next" metadata is based on analysis of the content of pages in the world wide web and is not provided by the web page.

27. The method of claim 1, wherein the displaying step includes the step of displaying "Where to go next" metadata, in accordance with the received information, wherein the "Where to go next" metadata is based on information relating to the organization or individuals associated with the displayed web page and is not provided by the web page.

28. The method of claim 1 further comprising:
examining, by the metadata server, all parent web pages above the web page in the web site hierarchy; and
classifying metadata of a parent of the web page as also being metadata of the web page.

29. A method of directing a user to at least one web page related to a web page displayed on a display device by a browser, comprising the steps, performed by a data processing system, of:
receiving information describing the contents of the displayed web page;
sending, to a metadata server, a request for an automatically generated identification of the related web page in accordance with the contents of the displayed web page, the metadata server being different from the server providing the displayed web page; and
displaying, on the same display device as the web page and concurrently with the web page, automatically generated metadata about the web page including at least one link directing a user to a web page related to the web page being displayed, the automatically generated metadata being supplemental information about the web page, the automatically generated supplemental information not being provided by the web page and not being provided by a member of a group to which a viewer of the web page belongs, but instead received from the metadata server in response to the request, there being no link between the web page and the automatically generated supplemental information.

30. The method of claim 29, wherein at least one web page to which the user is directed is not referenced by the web page currently being displayed.

31. A computer program product, on a computer readable medium, which presents information augmenting the information on a web page being displayed on a display device by a browser, the computer program product comprising:
program code for receiving information identifying the web page to be displayed;
program code for sending, to a metadata server, a request for automatically generated metadata, the automatically generated metadata being supplemental information about the web page to be displayed, the automatically generated supplemental information not being provided by the web page and not being provided by a member of a group to which a viewer of the web page belongs, there being no link between the web page and the automatically generated supplemental information, the metadata server being different from the server providing the web page; and
program code for displaying, on the same display device as the web page and concurrently with the web page, the automatically generated metadata received from the metadata server in response to the request, the automatically generated metadata including at least one link to a web page provided by a third party.

32. The computer program product of claim 31, wherein the program code for sending includes program code for sending the request automatically when the web page is displayed by the browser.

33. The computer program product of claim 31, wherein the program code for displaying includes program code for displaying, to supplement the web page being displayed, an advertisement targeted at users who request a URL of the web page, the advertisement being provided by the metadata server, not by the web page.

34. An apparatus for augmenting the information on a web page being displayed on a display device by a browser, the apparatus comprising:
a software portion configured to receive information identifying the web page to be displayed;
a software portion configured to send, to a metadata server, a request for automatically generated metadata, the automatically generated metadata being supplemental information about the web page to be displayed, the automatically generated supplemental information not being provided by the web page and not being provided by a member of a group to which a viewer of the web page belongs, there being no link between the web page and the automatically generated supplemental information, the metadata server being different from the server providing the web page; and
a software portion configured to display, on the same display device as the web page and concurrently with the web page, the automatically generated metadata received from the metadata server in response to the request, the automatically generated metadata including at least one link to a web page provided by a third party.

35. The apparatus of claim 34, including a software portion for opening a popup menu containing at least one link to another web page, the link being provided by the metadata server, not by the web page.

36. A computer program product on a computer readable medium which directs a user to at least one web page related to a web page displayed on a display device by a browser, the computer program product comprising:
program code for receiving information describing the contents of the displayed web page;
program code for sending, to a metadata server, a request for an automatically generated identification of the related web page in accordance with the contents of the displayed web page, the metadata server being different from the server providing the displayed web page; and
program code for displaying, on the same display device as the web page and concurrently with the web page, the automatically generated metadata about the web page including at least one link directing a user to a web page related to the web page being displayed, the automatically generated metadata being supplemental information about the web page, the automatically generated supplemental information not being provided by the web page and not being provided by a member of a group to which a viewer of the web page belongs, but instead received from the metadata server in response to the request, there being no link between the web page and the automatically generated supplemental information.

37. An apparatus for directing a user to at least one web page related to a web page displayed on a display device by a browser, the apparatus comprising:
a software portion for receiving information describing the contents of the displayed web page;
a software portion for sending, to a metadata server, a request for an automatically generated identification of the related web page in accordance with the contents of the displayed web page, the metadata server being different from the server providing the displayed web page; and a software portion for displaying, on the same display device as the web page and concurrently with the web page, the automatically generated metadata about the web page including at least one link directing a user to a web page related to the web page being displayed, the automatically generated metadata being supplemental information about the web page, the automatically generated supplemental information not being provided by the web page and not being provided by a member of a group to which a viewer of the web page belongs, but instead received from the metadata server in response to the request, there being no link between the web page and the automatically generated supplemental information.

38. A method of presenting information augmenting the information on a web page being displayed on a display device by a browser, comprising the steps, performed by a data processing system, of:

determining the address of the web page currently being displayed;

sending, to a metadata server the address of the web page currently being displayed, and a request for automatically generated metadata describing the web page currently being displayed, the automatically generated metadata being supplemental information about the web page being displayed, the automatically generated supplemental information not being provided by the web server and not being provided by a member of a group to which a viewer of the web page belongs, there being no link between the web page and the automatically generated supplemental information, the metadata server being different from the server providing the web page; and displaying, on the same display device as the web page and concurrently with the web page, the automatically generated metadata received from the metadata server in response to the request, the automatically generated metadata including at least one link to a web page provided by a third party.

39. A method of presenting information that augments the information on any web page being displayed on a display device by a browser, comprising:

receiving a request from a user to display a first web page;

sending, to a metadata server, a request for metadata indicating which web page a substantial number of previous users viewed next after viewing the requested first web page, the metadata not being provided by the first web page and not being provided by a member of a group to which the requesting user of the first web page belongs, there being no link between the first web page and the metadata, the metadata server being different from a server providing the web page; and displaying, on the same display device as the first web page and concurrently with the first web page, the requested metadata indicating which web page a substantial number of previous users viewed next after viewing the requested first web page.

40. The method of claim 39, further comprising:

gathering information about which web page a substantial number of previous users viewed next after viewing the first web page.

41. The method of claim 39, wherein the information about which web page a substantial number of previous users viewed next after viewing the requested first web page includes a plurality of links to the web pages that were most often viewed next.

42. The method of claim 39, further including allowing the user to add a one-way link to the metadata that specifies a "where to go" page for the first web page.

43. The method of claim 39, further including allowing the user to add a two-way link to the metadata that specifies another page as a "where to go" page for the first web site and that specifies the first web site as a "where to go" page for the other page.

44. A method of presenting information that augments the information on any web page being displayed on a display device by a browser, comprising:

receiving information identifying the web page to be displayed;

sending, to a metadata server, a request for metadata, the metadata being supplemental information about the web page to be displayed, the supplemental information being automatically generated thy a computer program associated with the metadata server, the metadata not being provided by the web page to be displayed and not being provided by a member of a group to which the requesting user of the web page belongs, there being no link between the web page and the metadata, the metadata server being different from a server providing the web page; and displaying, on the same display device as the web page and concurrently with the web page, the automatically generated metadata received from the metadata server in response to the request.

45. A method of presenting information that augments the information on any web page being displayed on a display device by a browser, comprising:

receiving information identifying the web page to be displayed;

sending, to a metadata server, a request for metadata, the metadata being supplemental information about the web page to be displayed, the supplemental information comprising at least one link to a web page provided by a third party, the link being automanticaly generated by a computer program associated with the metadata server, there being no link between the web page and the metadata, the metadata server being different from a server providing the web page; and displaying, on the same display device as the web page and courently with the web page, the automatically generated metadata received from the metadata server in response to the request.

46. The method of claim 45, wherein the link to the web page provided by a third party is automatically generated based upon a statistic indicating that a substantial number of past users viewing the web page to be displayed subsequently requested to view the web page provided by a third party.

47. The method of claim 45, wherein the link to the web page provided by a third party is automatically generated based upon the fact that the web page to be displayed and the web page provided by a third party both contain a link to a second web page provided by a third party.

* * * * *

UNITED STATES PATENT AND TRADEMARK OFFICE
CERTIFICATE OF CORRECTION

PATENT NO. : 6,282,548 B1
DATED : August 28, 2001
INVENTOR(S) : Michael G. Burner, Bruce C. Gilliat, Eric W. Jaquith, David L. Marvit, Brewster Kahle, Niall O'Driscoll, Z.E. Smith and Ronna C. Tanenbaum It is certified that error appears in the above-identified patent and that said Letters Patent is hereby corrected as shown below:

Column 26,
Line 20, delete "thy" and replace with -- by --.
Line 47, delete "courently" and replace with -- concurrently --

Signed and Sealed this

Twelfth Day of March, 2002

*Attest:*

*Attesting Officer*

JAMES E. ROGAN
*Director of the United States Patent and Trademark Office*